US011457492B2

(12) United States Patent
Patel et al.

(10) Patent No.: US 11,457,492 B2
(45) Date of Patent: Sep. 27, 2022

(54) TECHNIQUE FOR PROVIDING RELIABLE WIRELESS COMMUNICATION

(71) Applicant: Telefonaktiebolaget LM Ericsson (publ), Stockholm (SE)

(72) Inventors: Dhruvin Patel, Aachen (DE); Patrik Salmela, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 90 days.

(21) Appl. No.: 17/258,809

(22) PCT Filed: Jul. 10, 2018

(86) PCT No.: PCT/EP2018/068646
§ 371 (c)(1),
(2) Date: Jan. 8, 2021

(87) PCT Pub. No.: WO2020/011340
PCT Pub. Date: Jan. 16, 2020

(65) Prior Publication Data
US 2021/0307097 A1    Sep. 30, 2021

(51) Int. Cl.
*H04W 52/34* (2009.01)
*H04W 76/15* (2018.01)
(Continued)

(52) U.S. Cl.
CPC .......... *H04W 76/15* (2018.02); *H04W 12/06* (2013.01); *H04W 88/06* (2013.01)

(58) Field of Classification Search
CPC ............ H04W 76/15; H04W 36/0027; H04W 36/0069; H04W 12/06
See application file for complete search history.

(56) References Cited

U.S. PATENT DOCUMENTS

2020/0245257 A1*  7/2020  Pelletier .............. H04W 52/367

FOREIGN PATENT DOCUMENTS

WO    WO 2016078699 A1    5/2016

OTHER PUBLICATIONS

International Search Report and Written Opinion of the International Searching Authority, PCT/EP2018/068646, dated Nov. 12, 2018, 9 pages.

(Continued)

*Primary Examiner* — Gary Lafontant
(74) *Attorney, Agent, or Firm* — Sage Patent Group

(57) ABSTRACT

A wireless device includes a first mobile equipment and a second mobile equipment sharing a single subscriber identity module. The wireless device sends a first attach request as part of a first attach procedure to a cellular network using the first mobile equipment via a first base station to establish a first communication channel to the cellular network, and sends a second attach request as part of a second attach procedure to the cellular network using the second mobile equipment via a second base station to establish a second communication channel to the cellular network. The first and second attach procedures are performed using a same subscriber identity provided by the single subscriber identity module. Upon completion of the first and second attach procedures, data communicated between the wireless device and the cellular network is transferred redundantly over the first communication channel and the second communication channel.

20 Claims, 17 Drawing Sheets

(51) Int. Cl.
*H04W 12/06* (2021.01)
*H04W 88/06* (2009.01)

(56) References Cited

OTHER PUBLICATIONS

Aijaz, Adnan, "Packet Duplication in Dual Connectivity Enabled 5G Wireless Networks: Overview and Challenges," arxiv.org, Cornell University Library, Ithaca, NY, Apr. 3, 2018, 8 pages.

Kirrmann, Hubert, "Highly Available Automation Networks Standard Redundancy Methods—Rationales behind the IEC 62439 standard suite," ABB Switzerland Ltd, Corporate Research, 2012, 51 pages.

Henda, Noomene Ben et al., "Formal Verification of the Security for Dual Connectivity in LTE," 2015 IEEE/ACM 3rd FME Workshop on Formal Methods in Software Engineering, Florence, 2015, 7 pages.

3GPP TS 29.274 v15.3.0 (Mar. 2018), 3rd Generation Partnership Project; Technical Specification Group Core Network and Terminals; 3GPP Evolved Packet System (EPS); Evolved General Packet Radio Service (GPRS); Tunnelling Protocol for Control plane (GTPv2-C); Stage 3 (Release 15), 382 pages.

\* cited by examiner

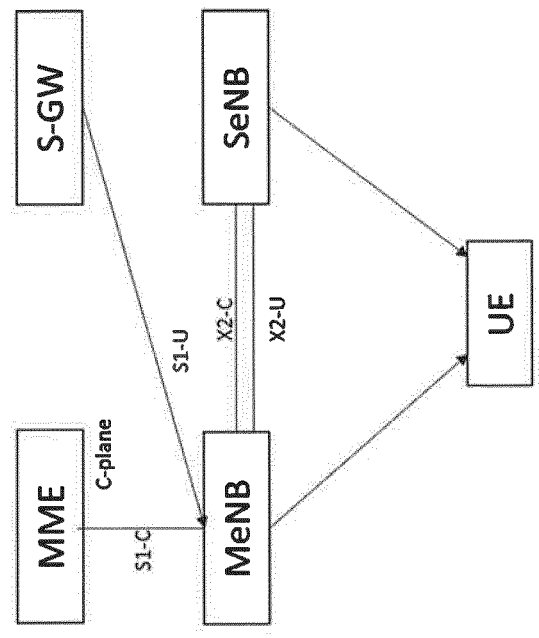
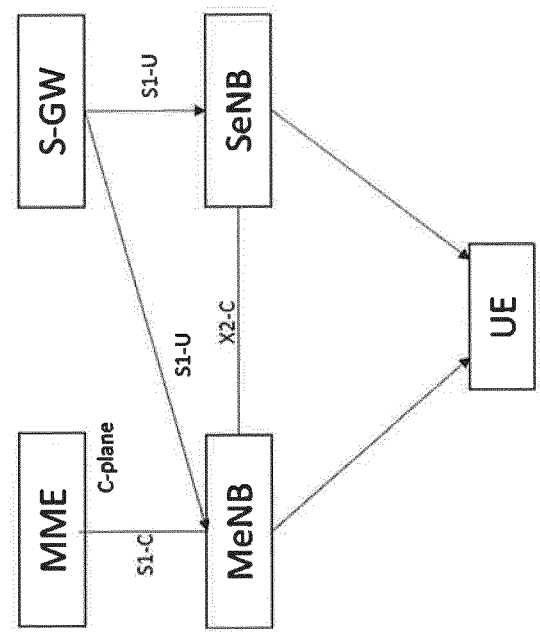
Fig. 2

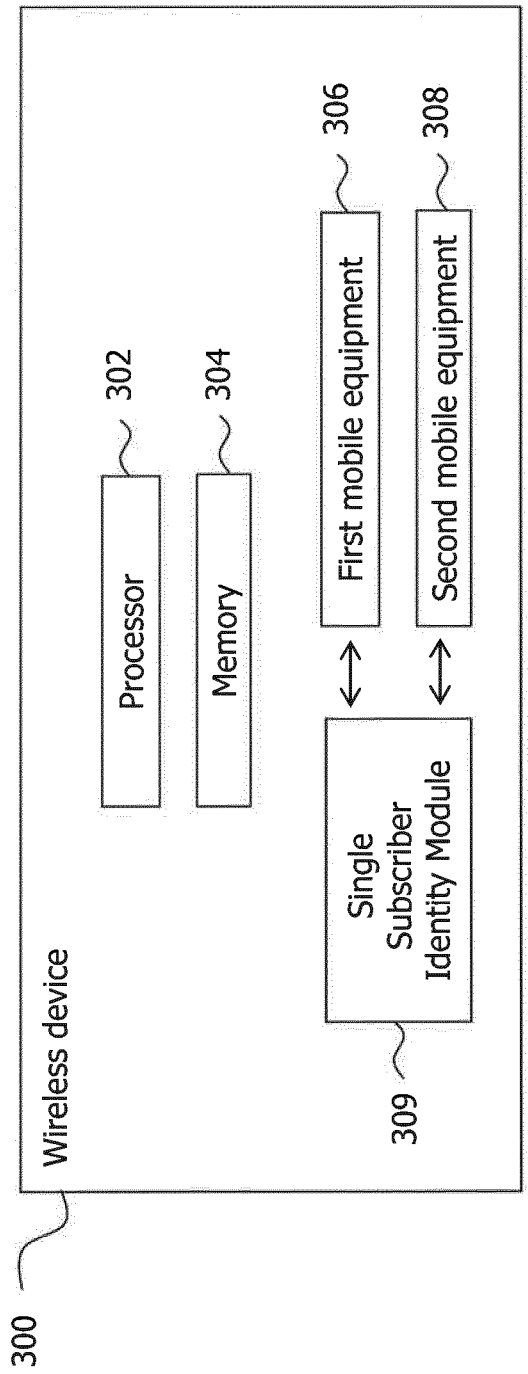
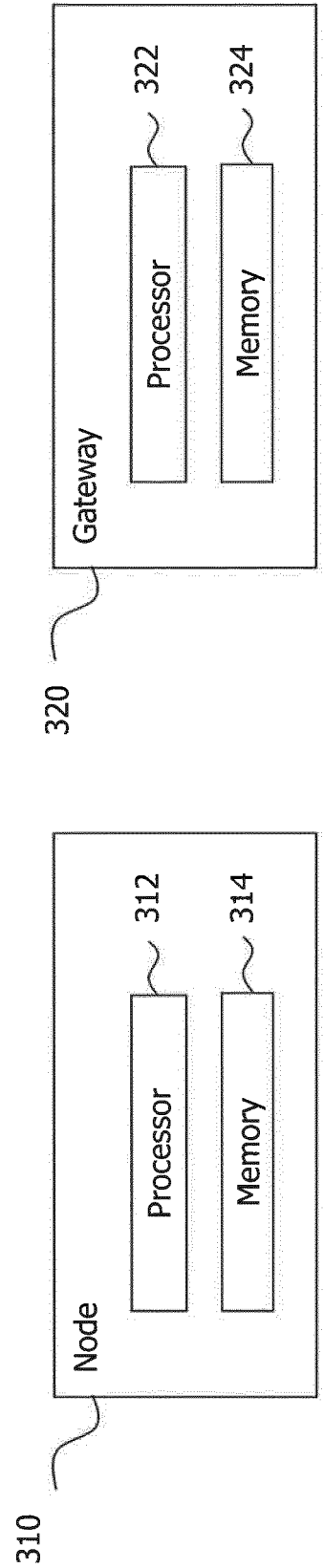
Fig. 3a
Fig. 3b
Fig. 3c

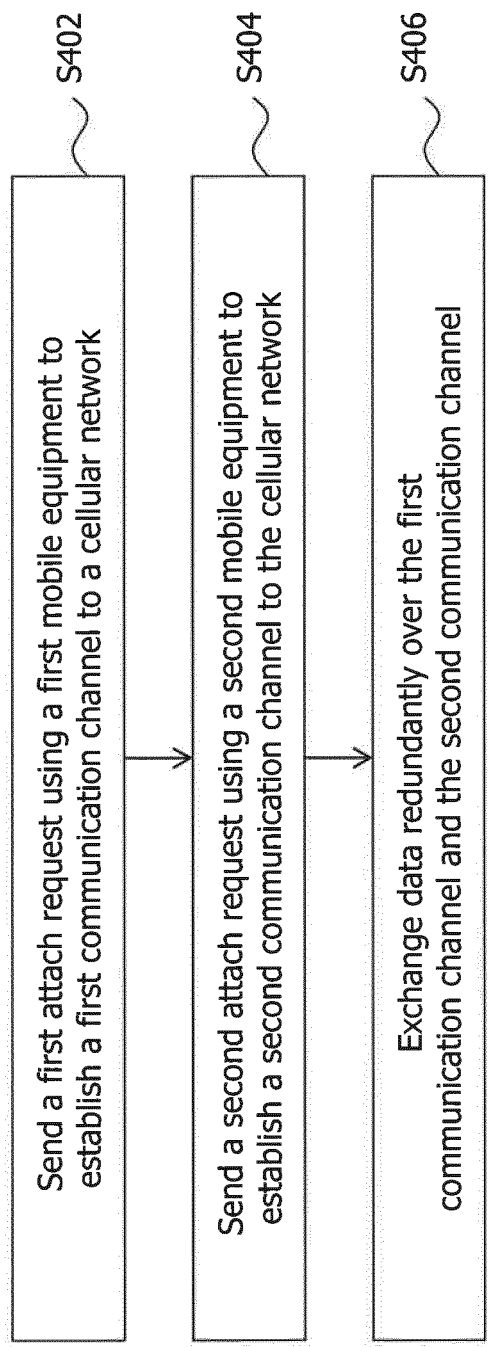

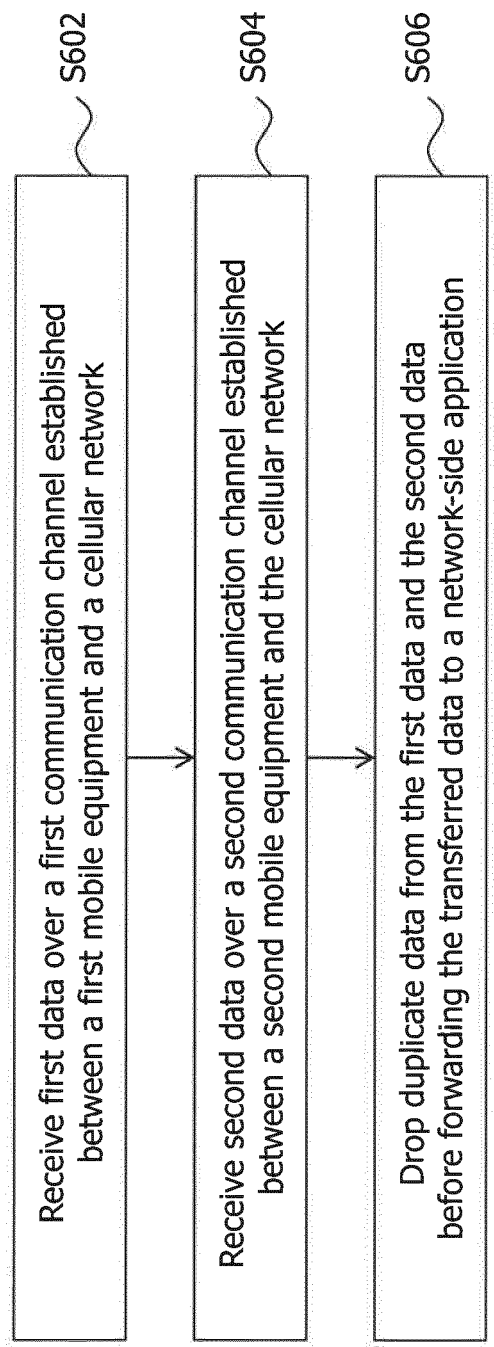

TECHNIQUE FOR PROVIDING RELIABLE WIRELESS COMMUNICATION

CROSS REFERENCE TO RELATED APPLICATIONS

This application is a 35 U.S.C. § 371 national stage application of PCT International Application No. PCT/EP2018/068646 filed on Jul. 10, 2018, the disclosure and content of which is incorporated by reference herein in its entirety.

TECHNICAL FIELD

The present disclosure generally relates to the field of wireless communication. In particular, a technique for providing reliable wireless communication between a wireless device and a cellular network is presented. The technique may be embodied in methods, computer programs, apparatuses and systems.

BACKGROUND

In the industrial manufacturing domain, communication capabilities supporting high reliability, availability as well as low and deterministic latency are generally desired. For conventional industrial manufacturing applications or services, these requirements are typically met by the provision of Industrial Ethernet (IE) solutions which are capable of supporting grace times (i.e., times for recovery from a failure before taking emergency actions) of less than 10 ms in case of hard real-time robot control, for example. With the rapid evolvement of mobile communication networks and distributed devices, it is nowadays envisioned that Ethernet for industrial applications is replaced by wireless networks, such as 4G or 5G networks, for example.

In the context of conventional 3GPP networks, however, whenever a node failure or communication link failure occurs, Radio Resource Control (RRC) procedures including Non-Access Stratum (NAS) security setup and authentication procedures generally start over. These procedures may require multiple roundtrips incurring latency and may therefore result in loss of availability for an application or service running on top of the radio connection due to the reattachment of the User Equipment (UE) to the network. Signaling involved in these procedures may be seen in FIG. 1 which illustrates a conventional 3GPP network attach procedure. It will be understood that the shown attach procedure is simplified and only focuses on those aspects which are relevant in the context of the present disclosure.

As may be seen in FIG. 1, a network attach generally starts with the UE sending an attach request to the eNodeB (eNB) containing the identity of the UE, e.g., an International Mobile Subscriber Identity (IMSI), as well as the UE network capabilities. It is noted in this regard that, as understood herein, the UE corresponds to a combination of a Mobile Equipment (ME) and a Universal Subscriber Identity Module (USIM). FIG. 1 thus indicates the ME and the USIM as separate entities, which together represent the UE. The eNB forwards the information received from the UE to the Mobility Management Entity (MME) which, based on the IMSI, requests authentication vectors (AVs) from the Home Subscriber Server (HSS). The HSS, in turn, provides a set of AVs to the MME, each containing authentication-related data including an authentication token (AUTN) for authenticating the network, a random number (RAND) representing a challenge to the UE, an expected response (XRES) representing an expected response to the challenge, and an access security management entity key ($K_{ASME}$) representing a root key to be used by the MME for the specific AV. The MME then sends, via the eNB, an authentication request to the UE containing the AUTN and the RAND. The USIM verifies the AUTN, generates a Cipher Key (CK) and an Integrity Key (IK) and computes a response (RES) to the challenge. The ME obtains these keys from the USIM and sends the RES to the MME. The ME also computes the $K_{ASME}$ from the obtained keys. The MME then verifies whether the received result RES matches the expected result XRES and, if there is a match, the UE is considered to be authenticated. As indicated in FIG. 1, this procedure corresponds to a standard Authentication and Key Agreement (AKA) procedure.

Subsequently, the MME sends a NAS security mode command to the UE indicating which algorithms are to be used for NAS signaling. Based on this, the ME generates the NAS keys and then sends a NAS security mode complete message back to the MME. At this point, NAS security is configured and NAS signaling ends. The MME then generates an eNB key (keNB) and sends it to the eNB in an attach accept message together with the UE network capabilities. The eNB uses the received information for the generation of Access Stratum (AS) keys and then sends an AS security mode command to the UE. The UE, in turn, generates corresponding keys and responds with an AS security mode complete message. At this point, AS security is configured and AS security signaling ends. Meanwhile, the MME has configured a General Packet Radio Service (GPRS) Tunneling Protocol (GTP) tunnel for the UE at the Packet Gateway (PGW) of the network.

Again, once a UE connection fails due to a local error or an eNB failure, such attach procedure starts over and incurs delay that is noticed by the service or application running on top, which may eventually result in loss of availability. Such situation could generally be addressed by having two redundant UEs with two independent Subscriber Identity Module (SIM) cards, wherein each UE runs the same application or service. However, in such a case, the HSS needs to maintain multiple entries for both UEs and a server communicating with the UEs receives all traffic duplicated from two different flows, potentially creating problems regarding the internal state of the server. Also, the two UEs would typically connect to the same eNB so that, when the eNB fails, availability may still be lost. Another solution may be Dual Connectivity, a feature introduced with Long Term Evolution (LTE) networks, according to which the UE is connected to two eNBs simultaneously, i.e., a Master eNB (MeNB) and a Secondary eNB (SeNB), which operate on different carrier frequencies and are interconnected by traditional backhaul link interfaces. In Dual Connectivity, the RRC connection is maintained via the MeNB, while data traffic can go from the Serving Gateway (SGW) to both the MeNB and the SeNB, or it can go to the MeNB and can further be split from the MeNB to the SeNB, as shown in FIG. 2. However, in Dual Connectivity, there is only a single UE which represents a single point of failure and, therefore, Dual Connectivity cannot provide ultimate reliability in wireless communication either.

SUMMARY

Accordingly, there is a need for a technique that improves reliability of wireless communication in a wireless communication system.

According to a first aspect, a method for providing reliable wireless communication between a wireless device and a cellular network is provided. The wireless device comprises a first mobile equipment and a second mobile equipment sharing a single subscriber identity module. The method is performed by the wireless device and comprises sending a first attach request as part of a first attach procedure to the cellular network using the first mobile equipment via a first base station to establish a first communication channel to the cellular network, sending a second attach request as part of a second attach procedure to the cellular network using the second mobile equipment via a second base station to establish a second communication channel to the cellular network, wherein the first attach procedure and the second attach procedure are performed using a same subscriber identity provided by the single subscriber identity module and wherein, upon completion of the first attach procedure and the second attach procedure, data communicated between the wireless device and the cellular network is transferred redundantly over the first communication channel and the second communication channel.

The wireless device may serve as wireless communication gateway for a base application, wherein data transferred redundantly from the wireless device to the cellular network may originate from the base application. Data originating from the base application may be duplicated by a redundancy component before being transferred to the cellular network over the first communication channel and the second communication channel. Duplicate data transferred from the cellular network to the wireless device over the first communication channel and the second communication channel may be dropped by a redundancy component before forwarding the transferred data to the base application. The base application may be controlled by a network-side application via the cellular network.

The second attach request may be sent upon completion of the first attach procedure. In at least one of the first and the second attach procedure, a dual mode indication may be sent from the wireless device to the cellular network indicating that the wireless device intends to transfer data redundantly over the first communication channel and the second communication channel. Also, authentication-related data used in the first attach procedure may be reused in the second attach procedure, wherein the authentication-related data reused in the second attach procedure may comprise a set of authentication vectors stored by the cellular network in the first attach procedure. From the set of authentication vectors, an authentication vector already used in the first attach procedure may be reused for the second attach procedure, or an authentication vector different from an authentication vector used in the first attach procedure may be used in the second attach procedure. An authentication request sent from the cellular network to the second mobile equipment may then include a maintenance indication indicating to the wireless device to maintain a context already established for the first mobile equipment in the first attach procedure.

Alternatively or additionally, the authentication-related data reused in the second attach procedure may comprise authentication-related data stored by the wireless device in the first attach procedure. At least part of the authentication-related data or data derived therefrom may then be included in the second attach request. Also, as part of the second attach procedure, an authentication request for authenticating the second mobile equipment may be sent from the cellular network to the first mobile equipment, wherein the first mobile equipment may trigger verification of whether the authentication request belongs to the second attach procedure. An authentication response to the authentication request may then be sent to the cellular network by at least one of the first mobile equipment and the second mobile equipment.

According to a second aspect, a method for providing reliable wireless communication between a wireless device and a cellular network is provided. The method is performed by a node of the cellular network and comprises receiving a first attach request from a first mobile equipment of the wireless device via a first base station as part of a first attach procedure to establish a first communication channel between the cellular network and the wireless device, receiving a second attach request from a second mobile equipment of the wireless device via a second base station as part of a second attach procedure to establish a second communication channel between the cellular network and the wireless device, wherein, in the first attach procedure and the second attach procedure, a same subscriber identity is used and wherein, upon completion of the first attach procedure and the second attach procedure, data communicated between the wireless device and the cellular network is transferred redundantly over the first communication channel and the second communication channel.

The method according to the second aspect defines a method from the perspective of a node of the cellular network which may be complementary to the method performed by the wireless device according to the first aspect. Thus, as in the method of the first aspect, the second attach request may be received upon completion of the first attach procedure and, in at least one of the first and the second attach procedure, a dual mode indication may be received by the node from the wireless device indicating that the wireless device intends to transfer data redundantly over the first communication channel and the second communication channel. Also, authentication-related data used in the first attach procedure may be reused in the second attach procedure, wherein the authentication-related data reused in the second attach procedure may comprise a set of authentication vectors stored by the node in the first attach procedure. From the set of authentication vectors, an authentication vector already used in the first attach procedure may be reused for the second attach procedure, or an authentication vector different from an authentication vector used in the first attach procedure may be used in the second attach procedure. An authentication request sent from the node to the second mobile equipment may then include a maintenance indication indicating to the wireless device to maintain a context already established for the first mobile equipment in the first attach procedure.

Alternatively or additionally, the authentication-related data reused in the second attach procedure may comprise authentication-related data stored by the wireless device in the first attach procedure. At least part of the authentication-related data or data derived therefrom may then be included in the second attach request. Also, as part of the second attach procedure, an authentication request for authenticating the second mobile equipment may be sent from the node to the first mobile equipment. An authentication response to the authentication request may then be received by the node from at least one of the first mobile equipment and the second mobile equipment. Upon completion of the first attach procedure and the second attach procedure, the node may send a redundancy indication to a gateway of the cellular network indicating that data transferred over the first communication channel and the second communication channel is transferred redundantly.

According to a third aspect, a method for providing reliable wireless communication between a wireless device and a cellular network is provided. The method is performed by a gateway of the cellular network and comprises receiving first data over a first communication channel established between a first mobile equipment of the wireless device and the cellular network via a first base station, receiving second data over a second communication channel established between a second mobile equipment of the wireless device and the cellular network via a second base station, wherein the first data and the second data are associated with a same subscriber identity and wherein the first data and the second data are transferred redundantly over the first communication channel and the second communication channel, and dropping duplicate data from the first data and the second data before forwarding the transferred data to a network-side application.

The method according to the third aspect defines a method from the perspective of a gateway of the cellular network which may be complementary to the method performed by the wireless device according to the first aspect and/or the method performed by the node according to the second aspect. Thus, data to be transferred from the network-side application to the wireless device may be duplicated by the gateway before being transferred to the wireless device over the first communication channel and the second communication channel. As in the method of the second aspect, the gateway may receive a redundancy indication from a node of the cellular network indicating that data transferred over the first communication channel and the second communication channel is transferred redundantly. Upon receiving the redundancy indication, the gateway may prevent deleting a context established for the first data when a context of the second data collides with the context of the first data. The redundancy indication may be provided in the form of an extension field included in a session creation request message of an existing session creation protocol, or the redundancy indication may be provided in the form of a dedicated session creation request message extending an existing session creation protocol.

According to a fourth aspect, a computer program product is provided. The computer program product comprises program code portions for performing the method of at least one of the first, the second and the third aspect when the computer program product is executed on one or more computing devices (e.g., a processor or a distributed set of processors). The computer program product may be stored on a computer readable recording medium, such as a semiconductor memory, DVD, CD-ROM, and so on.

According to a fifth aspect, a wireless device for providing reliable wireless communication to a cellular network is provided. The wireless device comprises a first mobile equipment and a second mobile equipment sharing a single subscriber identity module, and the wireless device is configured to perform any of the method steps presented herein with respect to the first aspect. The wireless device may comprise at least one processor and at least one memory, wherein the at least one memory contains instructions executable by the at least one processor such that the wireless device is operable to perform any of the method steps presented herein with respect to the first aspect.

According to a sixth aspect, a node of a cellular network for providing reliable wireless communication between a wireless device and the cellular network is provided. The node is configured to perform any of the method steps presented herein with respect to the second aspect. The node may comprise at least one processor and at least one memory, wherein the at least one memory contains instructions executable by the at least one processor such that the node is operable to perform any of the method steps presented herein with respect to the second aspect.

According to a seventh aspect, a gateway of a cellular network for providing reliable wireless communication between a wireless device and the cellular network is provided. The gateway is configured to perform any of the method steps presented herein with respect to the third aspect. The gateway may comprise at least one processor and at least one memory, wherein the at least one memory contains instructions executable by the at least one processor such that the gateway is operable to perform any of the method steps presented herein with respect to the third aspect.

According to an eighth aspect, there is provided a system comprising a wireless device according to the fifth aspect, a node according to the sixth aspect and, optionally, a gateway according to the seventh aspect.

BRIEF DESCRIPTION OF THE DRAWINGS

Various implementations of the technique presented herein are described herein below with reference to the accompanying drawings, in which:

FIG. 2 schematically illustrates variants of conventional Dual Connectivity architectures in an LTE network;

FIGS. 3a to 3c illustrate exemplary compositions of a wireless device, a node of a cellular network and a gateway of a cellular network according to the present disclosure;

FIG. 4 illustrates a method embodiment which may be performed by the wireless device;

FIGS. 6a and 6b illustrate a modular composition of the gateway and a corresponding method embodiment which may be performed by the gateway;

DETAILED DESCRIPTION

Figure 1:
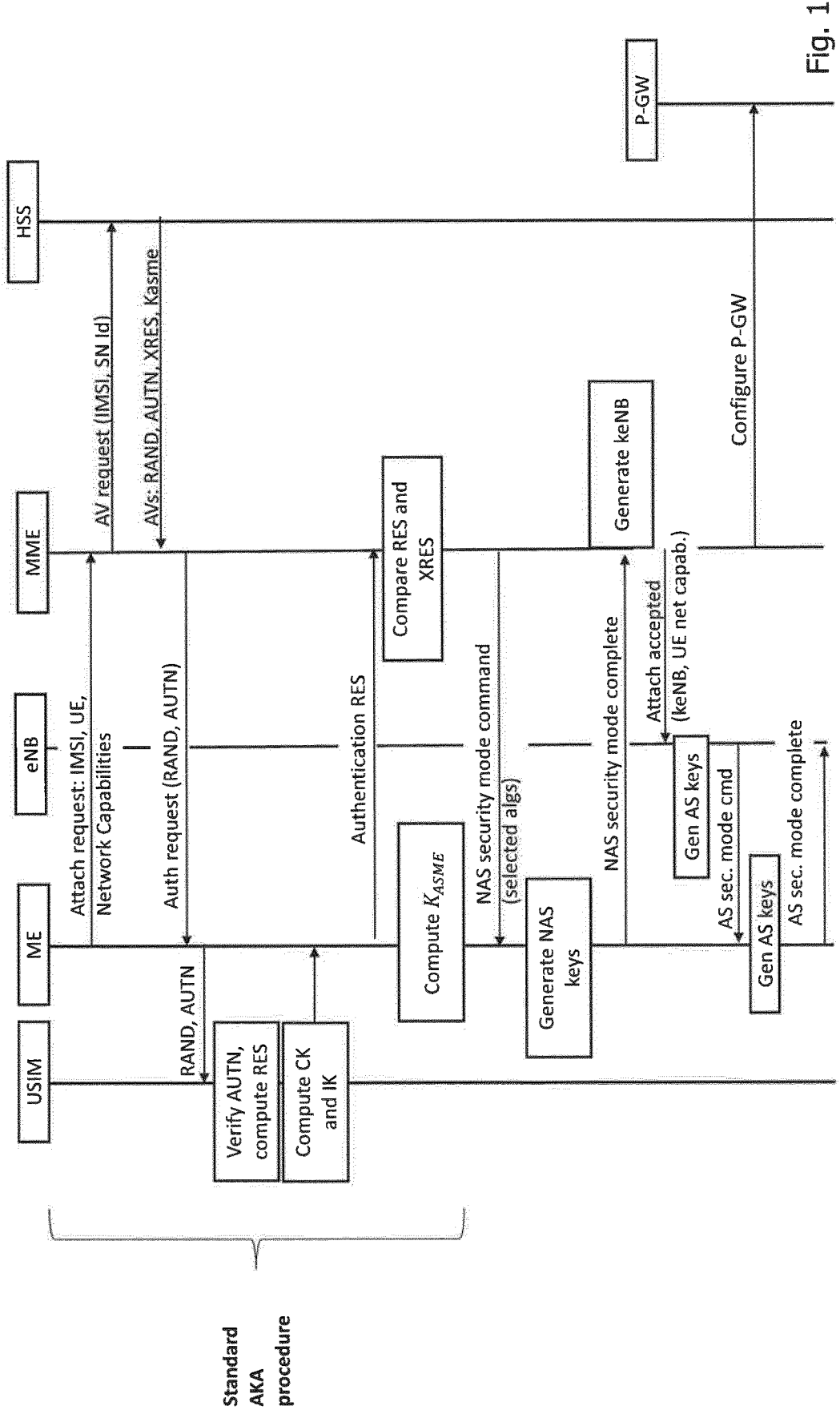
FIG. 1 illustrates a signaling diagram of an exemplary network attach procedure in a conventional 3GPP network.

In the following description, for purposes of explanation and not limitation, specific details are set forth in order to provide a thorough understanding of the present disclosure. It will be apparent to one skilled in the art that the present disclosure may be practiced in other embodiments that depart from these specific details. For example, while specific implementations will be described with reference to certain variants of 4G networks, it will be understood that the present disclosure shall not be limited thereto and that the technique presented herein may be practiced in other variants of wireless communication networks.

Those skilled in the art will further appreciate that the steps, services and functions explained herein below may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories are encoded with one or more programs that perform the steps, services and functions disclosed herein when executed by the one or more processors.

FIG. 3a schematically illustrates an exemplary composition of a wireless device 300 for providing reliable wireless communication to a cellular network. The wireless device 300 comprises at least one processor 302 and at least one memory 304, wherein the at least one memory 304 contains instructions executable by the at least one processor 302 such that the wireless device 300 is operable to carry out the method steps described herein below. The wireless device 300 further comprises a first mobile equipment 306 and a second mobile equipment 308 which share a single subscriber identity module 309. These will be described in more detail below.

FIG. 3b schematically illustrates an exemplary composition of a node 310 of a cellular network for providing reliable wireless communication between a wireless device and a cellular network. The node 310 comprises at least one processor 312 and at least one memory 314, wherein the at least one memory 314 contains instructions executable by the at least one processor 312 such that the node 310 is operable to carry out the method steps described herein below.

FIG. 3c schematically illustrates an exemplary composition of a gateway 320 of a cellular network for providing reliable wireless communication between a wireless device and a cellular network. The gateway 320 comprises at least one processor 322 and at least one memory 324, wherein the at least one memory 324 contains instructions executable by the at least one processor 322 such that the gateway 320 is operable to carry out the method steps described herein below.

It will be understood that at least one of the node 310 and the gateway 320 may be implemented as a physical computing unit as well as a virtualized computing unit, such as a virtual machine, for example. It will further be appreciated that at least one of the node 310 and the gateway 320 may not necessarily be implemented as a standalone computing unit, but may be implemented as components—realized in software and/or hardware—residing on multiple distributed computing units as well, such as in a cloud computing environment, for example.

FIG. 4 illustrates a method for providing reliable wireless communication between the wireless device 300 and a cellular network which may be performed by the wireless device 300 and which will be used in the following to describe the basic operation of the wireless device 300.

In step S402, the wireless device 300 sends a first attach request as part of a first attach procedure to the cellular network using the first mobile equipment 306 via a first base station to establish a first communication channel to the cellular network. In step S404, the wireless device 300 sends a second attach request as part of a second attach procedure to the cellular network using the second mobile equipment 308 via a second base station to establish a second communication channel to the cellular network. The first attach procedure and the second attach procedure are performed using a same subscriber identity provided by the single subscriber identity module 309 and, upon completion of the first attach procedure and the second attach procedure, data communicated between the wireless device 300 and the cellular network is transferred redundantly over the first communication channel and the second communication channel. In step S406, the wireless device 300 may thus exchange (i.e., send and/or receive) data between the wireless device 300 and cellular network redundantly over the first communication channel and the second communication channel. More specifically, the wireless device 300 may send or receive first data over the first communication channel and may send or receive second data over the second communication channel to the cellular network, wherein the first data and the second data are transferred redundantly. In the cellular network, the first data and the second data may be received by a gateway, such as gateway 320, which handles the redundantly transferred data on the network side before the transferred data is forwarded its destination (e.g., a network-side application), as will be described below. The first base station and the second base station may be different so that the first communication channel and the second communication channel may correspond to separate (e.g., physically separated) communication paths.

The first mobile equipment 306 and the second mobile equipment 308 may correspond to separate MEs (e.g., self-contained and independently operable MEs) included in the wireless device 300, which both have an interface to the single subscriber identity module 309 so that the single subscriber identity module 309 can be used as a common subscriber identity module by both MEs. The single subscriber identity module 309 may be a Universal Integrated Circuit Card (UICC) module which runs a USIM application, wherein the USIM application may record user specific data, such as an IMSI, a phone number, and a unique private key, for example. The single subscriber identity module 309 may generate keys for the AKA procedures of the first mobile equipment 306 and the second mobile equipment 308, e.g., based on the single unique private key recorded by the USIM application. The single subscriber identity module 309 may provide the same subscriber identity (e.g., IMSI) to both the first mobile equipment 306 and the second mobile equipment 308 for use in the first attach procedure and the second attach procedure, thereby enabling the cellular network to perceive both the first mobile equipment 306 and the second mobile equipment 308 as a single entity.

It will be understood that the first mobile equipment 306 and the second mobile equipment 308 do not necessarily have to be provided as separate self-contained MEs, but may also be realized as virtual MEs implemented (e.g., software-based) on a single physical ME of the wireless device 300, wherein the single physical ME may create multiple contexts with the cellular network via different base stations and may have two radio interfaces for this purpose (e.g., on two different chipsets). The cellular network may be any type of cellular wireless network, such as a 4G or 5G network, for example, and the first base station and the second base station may be an eNB or gNB (next generation NodeB) accordingly.

The data communicated between the wireless device 300 and the cellular network may be part of an end-to-end communication being performed between a device-side application and a network-side application over the cellular network (e.g., between a client application communicating with an Internet-based server application via the cellular network). The wireless device 300 may thus serve as wireless communication gateway for a base application (i.e., the device-side application), wherein data transferred redundantly from the wireless device 300 to the cellular network originates from the base application. The base application may be executed on the wireless device 300 itself or on a base device (i.e., a device separate from the wireless device) that uses the wireless device 300 as gateway device to communicate via the cellular network. The first mobile equipment 306 and the second mobile equipment 308 may thus be said to provide redundant connectivity to the same application or device.

Data originating from the base application may be duplicated by a redundancy component before being transferred by the wireless device 300 to the cellular network over the first communication channel and the second communication channel (for further delivery to the network-side application, for example). Similarly, duplicate data transferred from the cellular network to the wireless device 300 over the first communication channel and the second communication channel (e.g., data originating from the network-side application) may be dropped by the redundancy component before forwarding the transferred data to the base application. In other words, the redundancy component may ensure that data packets outgoing from the base application are copied before being transferred by the wireless device 300 over the cellular network and that duplicated data packets incoming from the cellular network are dropped so that only one copy of each incoming data packet is forwarded to the base application (i.e., one redundant packet is dropped and one is forwarded so that the redundant data flow is filtered down to a single flow). In this way, the base application may be agnostic of the redundant data transfer and the redundancy component may thus be said to hide the redundant wireless connectivity function from the base application.

In one such variant, the redundancy component may not wait until duplicated data packets are received (i.e., until both copies of a redundantly transferred packet are received), but may immediately forward the first copy of a redundantly transferred packet to the base application and may keep information on the first copy (e.g., based on sequence numbers used in packet headers or hashes) for some time and drop the second copy of the redundantly transferred packet, if the first copy has already been seen. In this way, latency in forwarding the packets may be reduced. The redundancy component may be part of the wireless device 300 or may be a component separate from the wireless device 300, such as a component executed on the base device, for example.

In one implementation, the base application may be controlled by the network-side application via the cellular network. For example, when the base application is executed on an industrial machine (the industrial machine may then be the base device) and the network-side application corresponds to an industrial machine controller (e.g., executed in a cloud computing environment), the industrial machine may be controlled by the industrial machine controller using the reliable wireless connection provided by the wireless device 300 and the cellular network. In a cloud robotics system, a robot controller (corresponding to the network-side application) may control a robot sensor (corresponding to the base application) over the cellular network, for example.

As to the attach procedures performed by the wireless device 300, both the first attach procedure and the second attach procedure may essentially take the form of the conventional network attach procedure described above. It is again referred to the description of FIG. 1 in this regard and unnecessary repetitions are omitted at this point. Modifications to this procedure may be required, however, in order to implement the technique presented herein. These modifications—as it may be the case for the first attach procedure and the second attach procedure, respectively—will be outlined below.

The first and the second attach procedure may be performed consecutively, e.g., the second attach request may be sent upon completion of the first attach procedure. In this way, the wireless device 300 may ensure that the second mobile equipment 308 does not attach to the cellular network via the first base station, but via another base station, so that it is made sure that the first base station and the second base station differ and that physically separated communication paths are provided, as described above.

As an exemplary modification to the conventional network attach procedure of FIG. 1, a dual mode indication may be sent, in at least one of the first and the second attach procedure, from the wireless device 300 to the cellular network indicating that the wireless device 300 intends to transfer data redundantly over the first communication channel and the second communication channel. In this way, the cellular network may be enabled to take preparatory measures to handle the redundantly transferred data on the network side. The dual mode indication may be included (e.g., in the form of a flag) in at least one of the first and the second attach request (e.g., as part of the UE network capabilities) or in the NAS security mode complete message sent from the UE to the cellular network (e.g., the MME), for example.

In order to ease the AKA procedures when attaching twice, i.e., in the first and the second attach procedure, and to reduce corresponding signaling if possible, authentication-related data used in the first attach procedure may be reused in the second attach procedure. The authentication-related data may be data other than the subscriber identity provided by the single subscriber identity module 309. In one implementation, the authentication-related data reused in the second attach procedure may comprise a set of authentication vectors (AVs) stored by the cellular network (e.g., by the MME) in the first attach procedure. For such reuse, the cellular network (e.g., the MME) may store the set of authentication vectors (e.g., as obtained from an HSS of the cellular network) in a database in the first attach procedure and may retrieve the set of authentication vectors from the database if needed in the second attach procedure. The database may be a database dedicated to be used for the dual mode technique described herein.

In one variant of reusing the set of authentication vectors, the cellular network (e.g., the MME) may select, from the set of authentication vectors, the same authentication vector as for the first mobile equipment 306. The second mobile equipment 308 may thus receive an authentication request from the cellular network with the same RAND and AUTN as in the first attach procedure, resulting in the same keys being used by the second mobile equipment 308, e.g., the CK and IK computed by the single subscriber identity module 309 in the first attach procedure may be reused for the second attach procedure. In other words, from the set of authentication vectors, an authentication vector already used in the first attach procedure may be reused for the second attach procedure. In order to protect against authentication reply re-transmission by an attacker, a security measure may be employed in this case, such as—considering the second use of the same authentication vector—making responses to the second authentication look differently, e.g., by encrypting the RES with $K_{ASME}$ and sending the encrypted RES instead of the plaintext RES.

In another variant of reusing the set of authentication vectors, the cellular network (e.g., the MME) may select, from the set of authentication vectors, an authentication vector different from the one used for the first mobile equipment 306, resulting in the second mobile equipment 308 receiving an authentication request with a different RAND and AUTN as well as different keys being used by the second mobile equipment 308. In this variant, from the set of authentication vectors, an authentication vector different from an authentication vector used in the first attach procedure may be used in the second attach procedure. An authentication request sent from the cellular network (e.g., the MME) to the second mobile equipment 308 may in this case include a maintenance indication indicating to the wireless device 300 to maintain a context already established for the first mobile equipment 306 in the first attach procedure. In this way, it may be ensured that a context already established for the first mobile equipment 306 is kept alive even if a new attach/AKA procedure is performed by the wireless device 300.

Alternatively or additionally, the authentication-related data reused in the second attach procedure may comprise authentication-related data stored by the wireless device 300 in the first attach procedure. At least part of the authentication-related data or data are derived therefrom may then be included in the second attach request. In other words, the second mobile equipment 308 may reuse authentication-related data already known from the first attach procedure and may provide such data or a derivative therefrom to the cellular network (e.g., the MME) with the second attach request, enabling the cellular network to authenticate the second mobile equipment 308 instantly without the need for further signaling, such as an authentication request/response scheme, for example. As an example, the second mobile equipment 308 may use the CK and IK computed by the single subscriber identity module 309 in the first attach procedure for the generation of the $K_{ASME}$ and sign the RAND with it, thereby creating a derivative of the authentication-related data (optionally, not only the RAND may be encrypted with the $K_{ASME}$, but also the RAND together with a device generated nonce in order to protect against an attacker replaying this message at a later point of time). The signed RAND may then be included in the second attach request and the cellular network (e.g., the MME) may, in order to authenticate the second mobile equipment 308, verify that the RAND is the one used by the first mobile equipment 306 and is signed by the $K_{ASME}$ of the first mobile equipment 306.

In another implementation, an authentication request for authenticating the second mobile equipment 308 may be sent, as part of the second attach procedure, from the cellular network (e.g., the MME) to the first mobile equipment 306 (i.e., different from where it received the second attach request), wherein the first mobile equipment 306 may trigger verification of whether the authentication request belongs to the second attach procedure. This may include checking by the wireless device 300 whether the second mobile equipment 308 has sent the second attach request, for example. In this way, attacks by random users trying to exploit the dual mode function and attempting to pretend to be the second mobile equipment 308 may be prevented. The authentication response to the authentication request may then be sent to the cellular network (e.g., the MME) by at least one of the first mobile equipment 306 and the second mobile equipment 308.

Figure 5A:
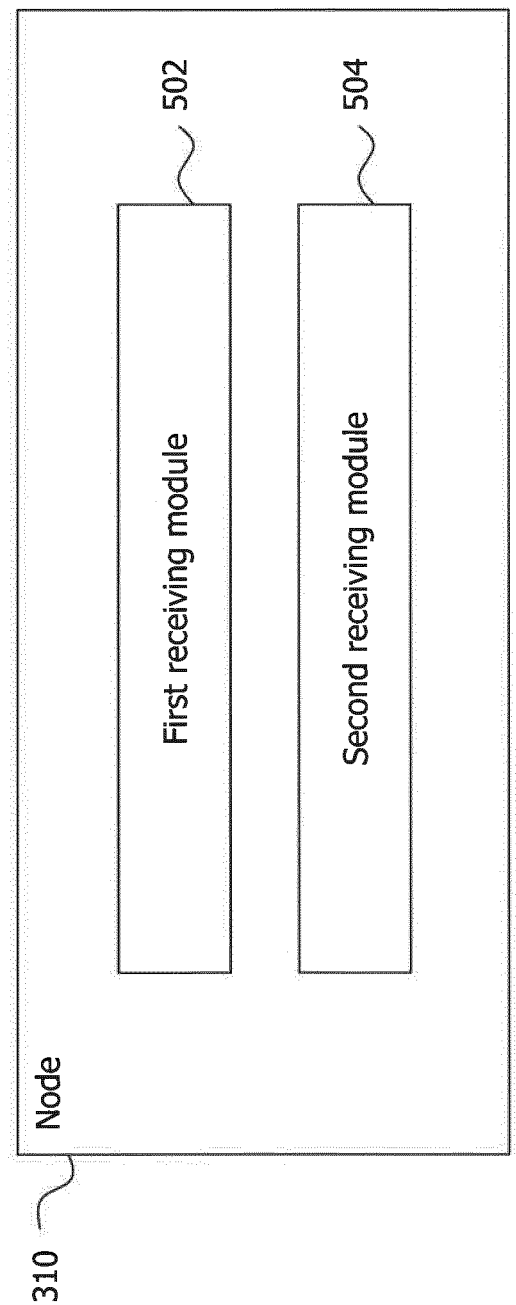
FIGS. 5a and 5b illustrate a modular composition of the node and a corresponding method embodiment which may be performed by the node.
Figure 5B:
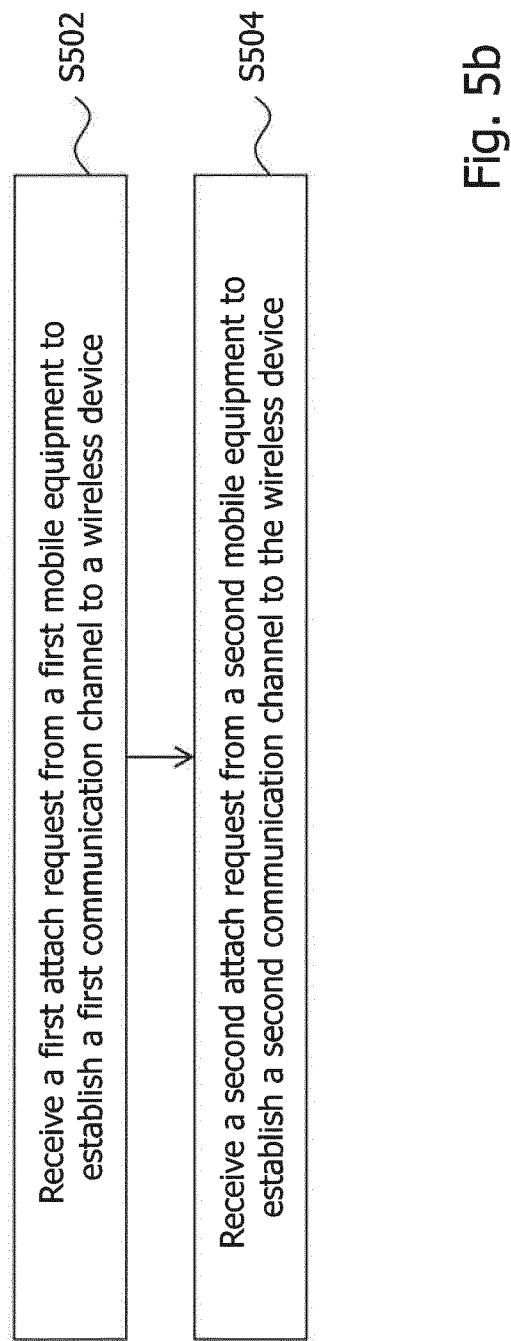

FIG. 5a schematically illustrates an exemplary modular composition of the node 310 of the cellular network and FIG. 5b illustrates a corresponding method which may be performed by the node 310. The basic operation of the node 310 will be described in the following with reference to both FIGS. 5a and 5b. This operation may be complementary to the operation of the wireless device 300 described above in relation to FIG. 4 and, as such, aspects described above with regard to the cellular network (in particular the MME) may be applicable to the node 310 described in the following as well, and vice versa. Unnecessary repetitions are thus omitted. The node 310 may be a mobility management entity, such as an MME in a 4G network or an Access and Mobility Function (AMF) in a 5G network, for example.

In step S502, a first receiving module 502 of the node 310 may receive a first attach request from the first mobile equipment 306 of the wireless device 300 via the first base station as part of the first attach procedure to establish the first communication channel between the cellular network and the wireless device 300. In step S504, a second receiving module 504 may receive a second attach request from the second mobile equipment 308 of the wireless device 300 via the second base station as part of the second attach procedure to establish the second communication channel between the cellular network and the wireless device 300. In the first attach procedure and the second attach procedure, the same subscriber identity is used and, upon completion of the first attach procedure and the second attach procedure, data communicated between the wireless device 300 and the cellular network is transferred redundantly over the first communication channel and the second communication channel.

As in the method of FIG. 4, the second attach request may be received upon completion of the first attach procedure. In at least one of the first and the second attach procedure, a dual mode indication may be received by the node 310 from the wireless device 300 indicating that the wireless device 300 intends to transfer data redundantly over the first communication channel and the second communication channel. Also, authentication-related data used in the first attach procedure may be reused in the second attach procedure, wherein the authentication-related data reused in the second attach procedure may comprise a set of authentication vectors stored by the node 310 in the first attach procedure. From the set of authentication vectors, an authentication vector already used in the first attach procedure may be reused for the second attach procedure, or an authentication vector different from an authentication vector used in the first attach procedure may be used in the second attach procedure. An authentication request sent from the node 310 to the second mobile equipment 308 may then include a maintenance indication indicating to the wireless device 300 to maintain a context already established for the first mobile equipment 306 in the first attach procedure.

Alternatively or additionally, the authentication-related data reused in the second attach procedure may comprise authentication-related data stored by the wireless device 300 in the first attach procedure. At least part of the authentication-related data or data derived therefrom may then be included in the second attach request. Also, as part of the second attach procedure, an authentication request for authenticating the second mobile equipment 308 may be sent from the node 310 to the first mobile equipment 306. An authentication response to the authentication request may then be received by the node 310 from at least one of the first mobile equipment 306 and the second mobile equipment 308.

In order to take preparatory measures so that the cellular network may correctly handle redundantly transferred data received from the wireless device 300 over the first communication channel and the second communication channel, the node 310 may establish a context (and configure a corresponding GTP tunnel, for example) for each of the first mobile equipment 306 and the second mobile equipment 308 in a gateway, such as the gateway 320 of the cellular network, for example. To indicate to the gateway that the contexts (and the GTP tunnels, for example) of the first mobile equipment 306 and the second mobile equipment 308 are to be linked together, the node 310 may send, upon completion of the first attach procedure and the second attach procedure, a redundancy indication to the gateway of the cellular network indicating that data transferred over the first communication channel and the second communication channel is transferred redundantly.

Figure 6A:
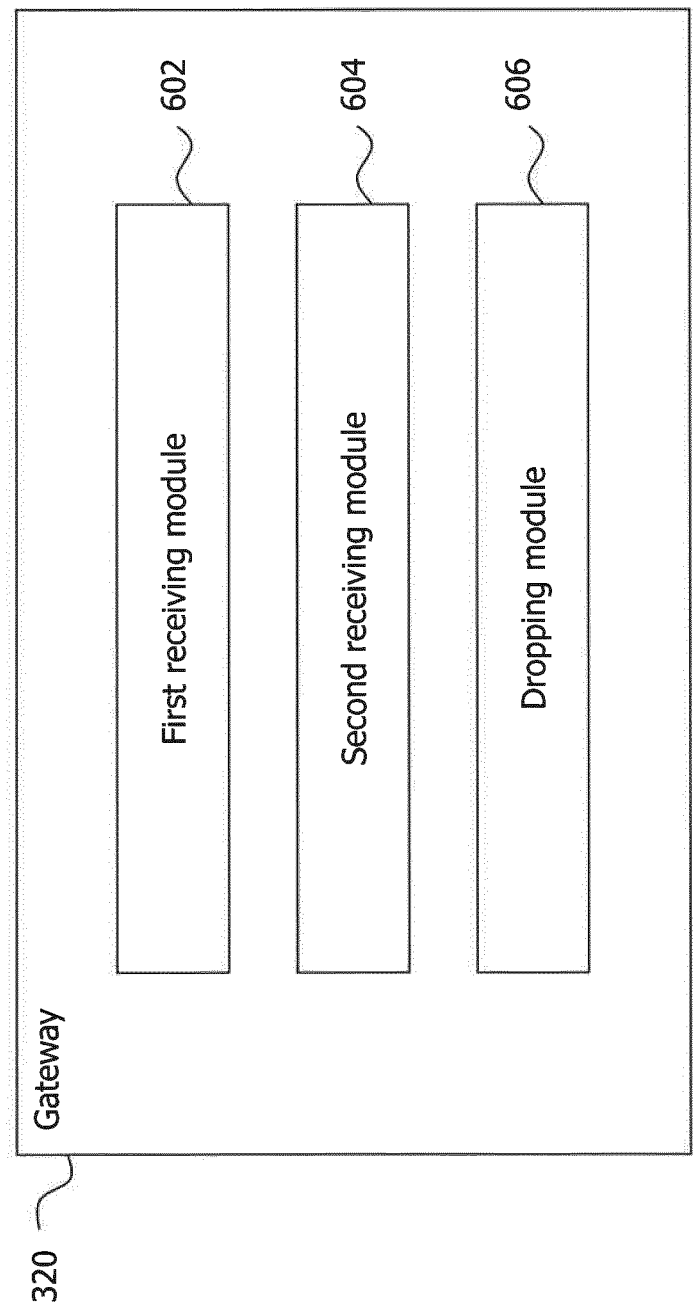

FIG. 6a schematically illustrates an exemplary modular composition of the gateway 320 of the cellular network and FIG. 6b illustrates a corresponding method which may be performed by the gateway 320. The basic operation of the gateway 320 will be described in the following with reference to both FIGS. 6a and 6b. This operation may be complementary to the operation of the wireless device 300 and the node 310 described above in relation to FIG. 4 as well as FIGS. 5a and 5b and, as such, aspects described above with regard to the gateway may be applicable to the gateway 320 described in the following as well, and vice versa. Unnecessary repetitions are thus omitted. The gateway 320 may be a packet gateway, such as a PGW in a 4G network or a User Plane Function (UPF) in a 5G network, for example.

In step S602, a first receiving module 602 of the gateway 320 may receive first data over the first communication channel established between the first mobile equipment 306 of the wireless device 300 and the cellular network via the first base station. In step S604, a second receiving module 604 of the gateway 320 may receive second data over the second communication channel established between the second mobile equipment 308 of the wireless device 300 and the cellular network via the second base station. The first data and the second data are associated with a same subscriber identity and the first data and the second data are transferred redundantly over the first communication channel and the second communication channel. In step S606, a redundancy module 606 of the gateway 320 may drop duplicate data from the first data and the second data before forwarding the transferred data to a network-side application. Also, data to be transferred from the network-side application to the wireless device 300 may be duplicated by the redundancy module 606 of the gateway 320 before being transferred to the wireless device 300 over the first communication channel and the second communication channel. Once duplicated, the gateway 320 may send the resulting data redundantly over the first communication channel and the second communication channel to the wireless device 300.

As described above, data communicated between the wireless device 300 and the cellular network may be part of an end-to-end communication being performed between a base application and the network-side application. The redundancy module 606 of the gateway 320 may thus ensure that data packets outgoing from the network-side application are copied before being forwarded by the gateway 320 to the wireless device 300 and that duplicated data packets incoming from the wireless device 300 are dropped so that only one copy of each incoming data packet is forwarded to the network-side application (i.e., one redundant packet is dropped and one is forwarded so that the redundant data flow is filtered down to a single flow). In this way, the network-side application may be agnostic of the redundant data transfer and the gateway 320 may thus be said to hide the redundant wireless connectivity function from the network-side application.

In one such variant, the gateway 320 may not wait until duplicated data packets are received (i.e., until both copies of a redundantly transferred packet are received), but may immediately forward the first copy of a redundantly transferred packet to the network-side application and may keep information on the first copy (e.g., based on sequence numbers used in packet headers or hashes) for some time and drop the second copy of the redundantly transferred packet, if the first copy has already been seen. In this way, latency in forwarding the packets may be reduced.

In accordance with the method of FIGS. 5a and 5b, the gateway 320 may receive a redundancy indication from the node 310 of the cellular network indicating that data transferred over the first communication channel and the second communication channel is transferred redundantly. Upon receiving the redundancy indication, the gateway 320 may install packet filtering rules to implement the packet dropping and duplicating behavior described above. Upon receiving the redundancy indication, the gateway 320 may further prevent deleting a context established for the first data when a content of the second data collides with the context of the first data. This may be necessary because conventional cellular networks may implement a behavior according to which an already existing context/session is deleted before creating a new context/session if the creation request collides with the existing context/session (e.g., when both contexts/sessions are mapped to the same IMSI). The redundancy indication may be provided in the form of an extension field included in a session creation request message of an existing session creation protocol, or in the form of a dedicated session creation request message extending an existing session creation protocol, for example.

While, in the above implementations, the technique presented herein has been described for redundant wireless connectivity using two redundant communication channels, i.e., the first communication channel and the second communication channel, it will be understood that the presented technique may generally be employed with N, where N>2, redundant communication channels, wherein the additional redundant communication channels may be subject to the principles discussed above for the first communication channel and the second communication channel as well.

The following FIGS. 7 to 15 illustrate exemplary embodiments of the technique presented herein which elucidate certain aspects of the above implementations in more detail.

Figure 7:
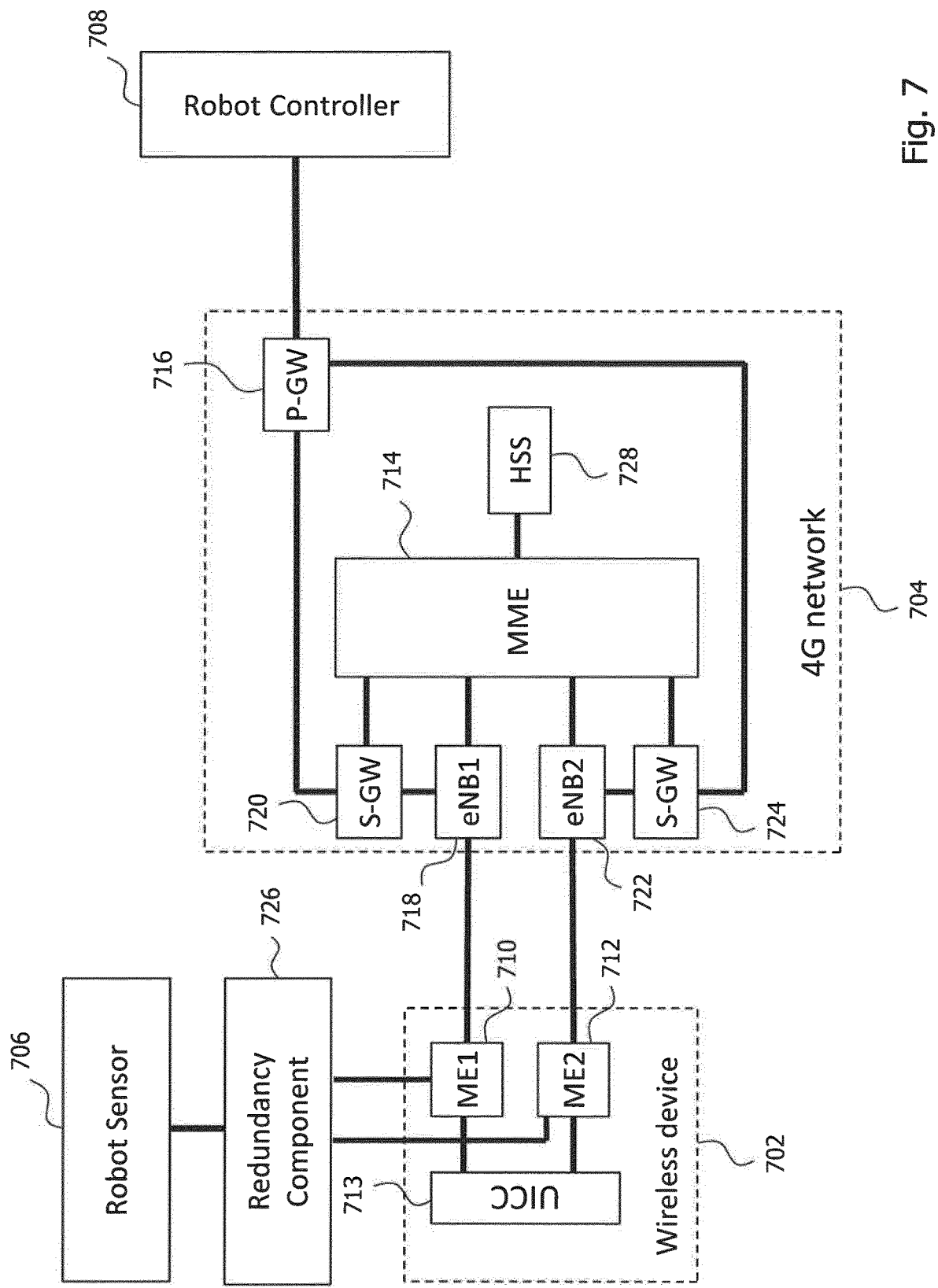
FIG. 7 illustrates an exemplary system in which a network-side application controls a base application using redundant connectivity provided by a wireless device and a cellular network according to the present disclosure.

FIG. 7 illustrates an exemplary system in which a wireless device 702 and a cellular network 704 provide redundant wireless connectivity between a base application 706 and a network-side application 708 (e.g., between a robot sensor and a robot controller, as shown in the figure). The wireless device 702 may correspond to the wireless device 300 and comprises a first mobile equipment 710 and a second mobile equipment 712 sharing a single subscriber identity module 713 (e.g., a UICC module, as shown in the figure). In the shown example, the cellular network is a 4G network and comprises an MME 714 (corresponding to the node 310) as well as a PGW 716 (corresponding to the gateway 320). As may be seen in the figure, data communicated between the base application 706 and the network-side application 708 is transferred redundantly over a first communication channel (or path) provided between the first mobile equipment 710 and the PGW 716 via a first base station 718 and a first SGW 720 as well as over a second communication channel (or path) provided between the second mobile equipment 712 and the PGW 716 via a second base station 722 and a second SGW 724. A redundancy component 726 is provided between the base application 706 and the wireless device 702 to hide the redundant wireless connectivity function from the base application 706, as described above. While, in the example of FIG. 7, the redundancy component 726 is external to the wireless device 702, it will be understood that the redundancy component 726 may also be included in the wireless device 702. Further, the MME 714 is connected to an HSS 728. Exemplary signaling between the entities shown in FIG. 7 will be described below with reference to FIGS. 9 to 15.

Figure 8:
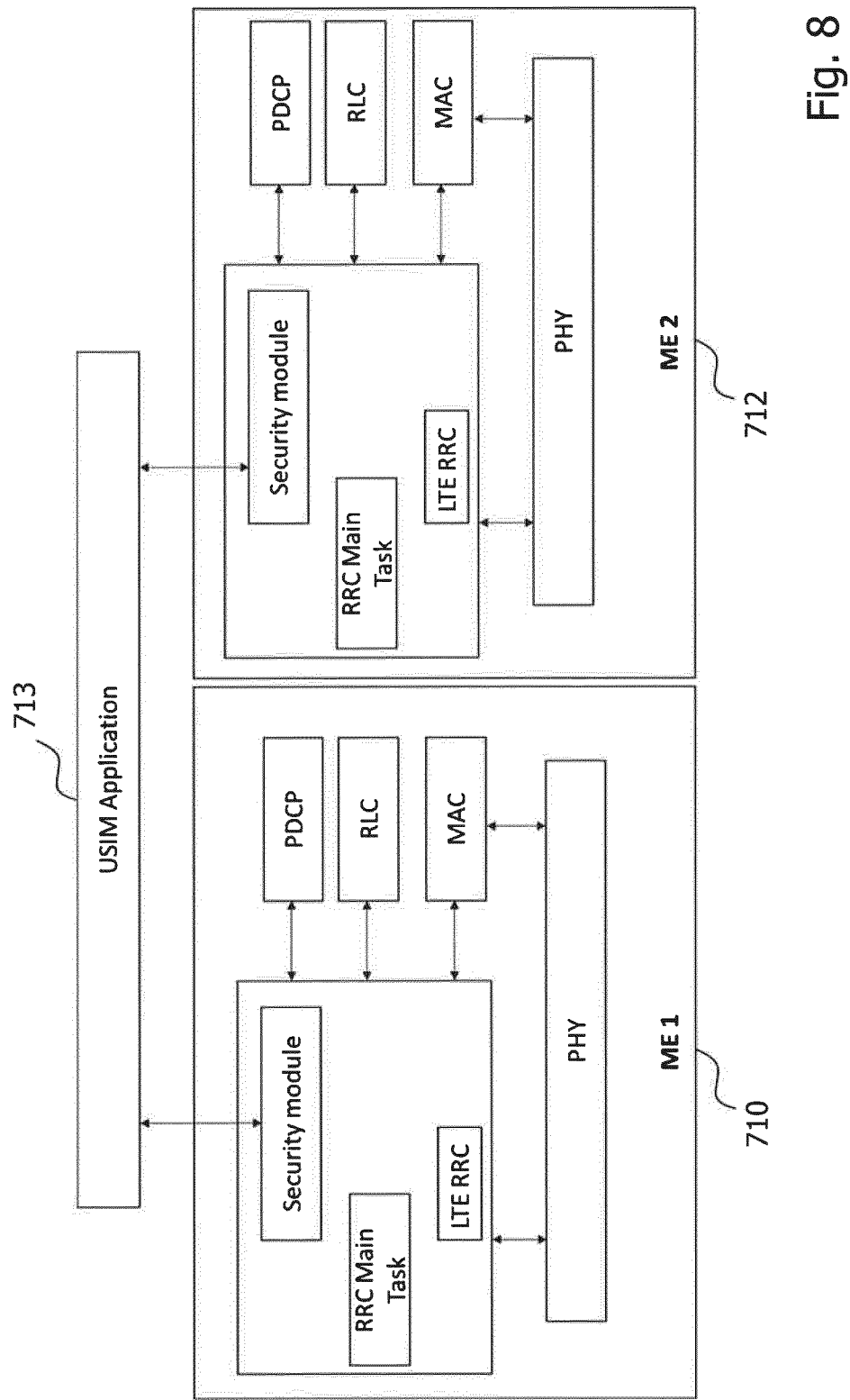
FIG. 8 schematically illustrates an exemplary detailed view of a first mobile equipment and a second mobile equipment interfacing with a single subscriber identity module.

FIG. 8 schematically illustrates an exemplary detailed view of the first mobile equipment 710 and the second mobile equipment 712 (including their radio stacks) interfacing with the single subscriber identity module 713 (shown as common USIM application). As indicated in figure, the individual security modules of the first mobile equipment 710 and the second mobile equipment 712 may interact with the common USIM application 713 to obtain and derive keys, such as the CK, IK and $K_{ASME}$ enabling ciphering and integrity checks and various layers, such as PDCP, for example.

Figure 9:
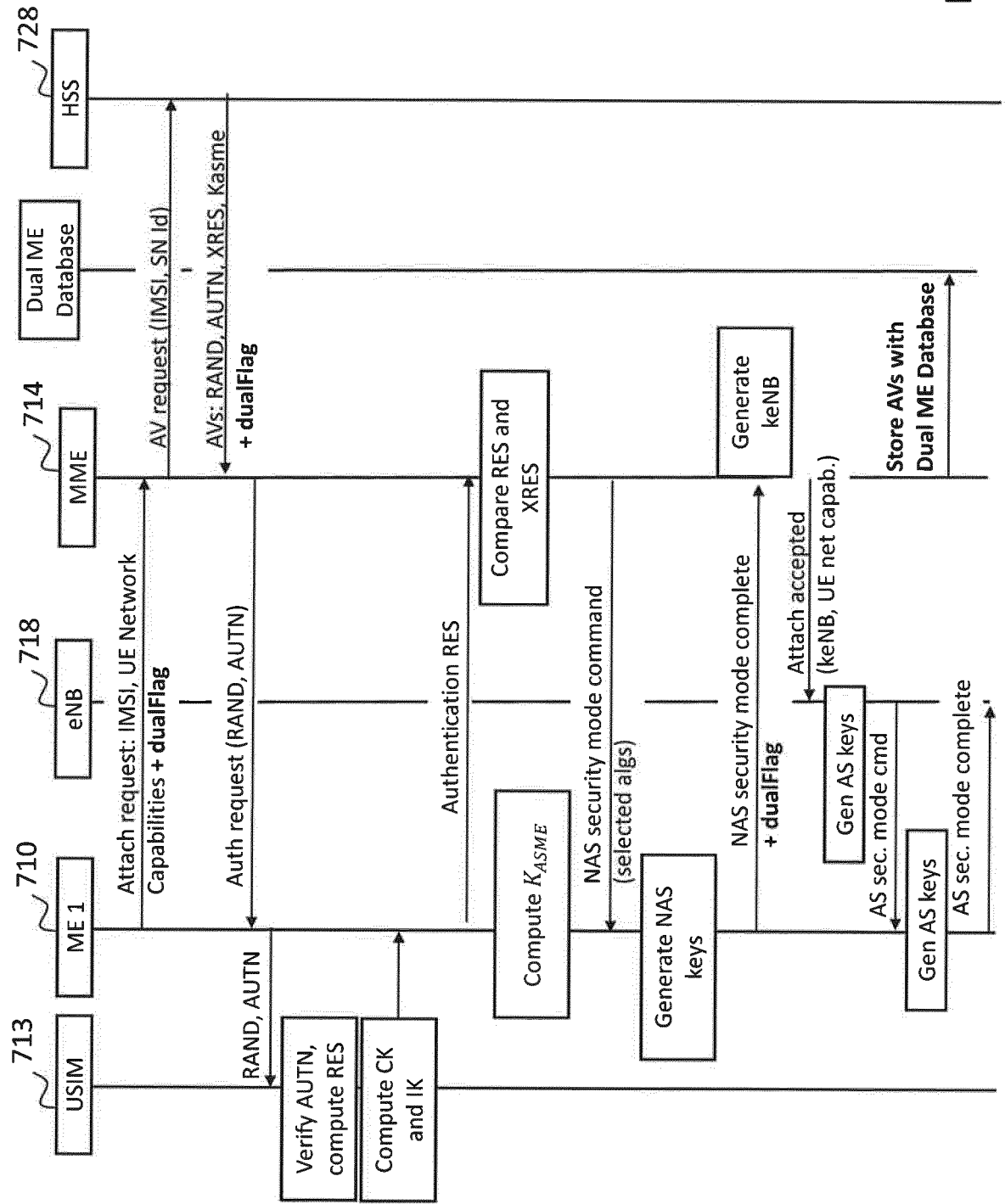
FIG. 9 illustrates a signaling diagram of an example of the first attach procedure according to the present disclosure.

FIG. 9 illustrates a signaling diagram of an example of the first attach procedure performed by the first mobile equipment 710. The procedure shown in FIG. 9 is almost identical to the conventional procedure shown in FIG. 1, with the some modifications which are indicated in bold font in FIG. 9. As indicated, the first mobile equipment 710 may signal to the MME 114 that it will be running in a dual ME mode (see the "dualFlag" indications), which can be realized by including a dual mode indication in the attach request message (e.g., as part of the UE network capabilities) or in the NAS security mode complete message, for example. The MME 714 may receive this information also together with the set of authentication vectors from the HSS 728. Also, to enable the reuse of the obtained set of authentication vectors in the second attach procedure, the MME 714 may store the set of authentication vectors in a database (indicated as "Dual ME Database" in the figure).

Figure 10:
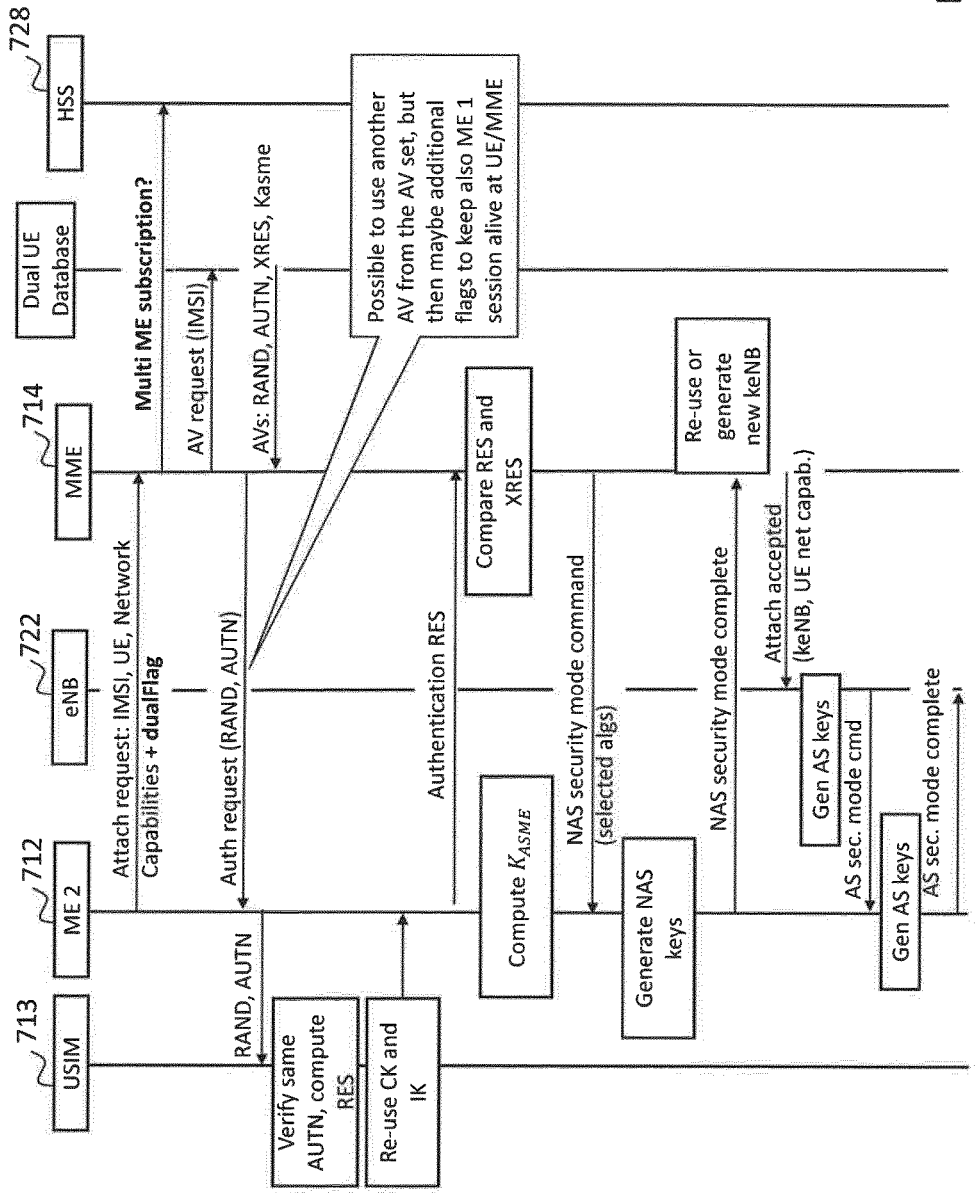
FIG. 10 illustrates a signaling diagram of a first exemplary variant of the second attach procedure according to the present disclosure.

FIG. 10 illustrates a signaling diagram of a first exemplary variant of the second attach procedure performed by the second mobile equipment 712 upon completion of the first attach procedure. The procedure shown in FIG. 10 is again almost identical to the conventional procedure of FIG. 1, but is different to the extent that a set of authentication vectors stored in the first attach procedure is reused. When the MME 714 thus receives the second attach request, it may notice that there is already an active context for the same IMSI. If not already aware of it from the first attach procedure, the MME 714 may verify that the wireless device 702 is allowed to operate in dual mode. This can be done using a dual mode indication included in the second attach request or by obtaining corresponding confirmation from the HSS 728 (optionally, also obtaining a maximum number of simultaneously allowed contexts). The MME 714 may then retrieve the set of authentication vectors from the Dual ME Database for the purpose of authenticating the second mobile equipment 712. In one variant, the MME 714 may select the same authentication vector from the set of authentication vectors as for the first mobile equipment 710 and may send an authentication request to the second mobile equipment 712 with the same RAND and AUTN as in the first attach procedure. The single subscriber identity module 713 may verify that the same AUTN is received, generate or reuse the response RES, use the same keys (CK and IK) as for the first mobile equipment 710, and provide the results to the second mobile equipment 712. From this point on, the second mobile equipment 712 may proceed with the attach procedure based on the provided results in the conventional manner.

In another variant, the MME 714 may select a different authentication vector from the set of authentication vectors for the second mobile equipment 712 so that the single subscriber identity module 713 gets a fresh authentication vector and performs a regular AKA procedure. In this way, necessary modifications to the second mobile equipment 712 and the single subscriber identity module 713 may be minimized. The first mobile equipment 710 and the second mobile equipment 712 may in this case have different keys and the MME 714 may need to provide a maintenance indication to the wireless device 702 to make sure that the previously established context for the first mobile equipment 710 is kept alive and not discarded.

Figure 11:
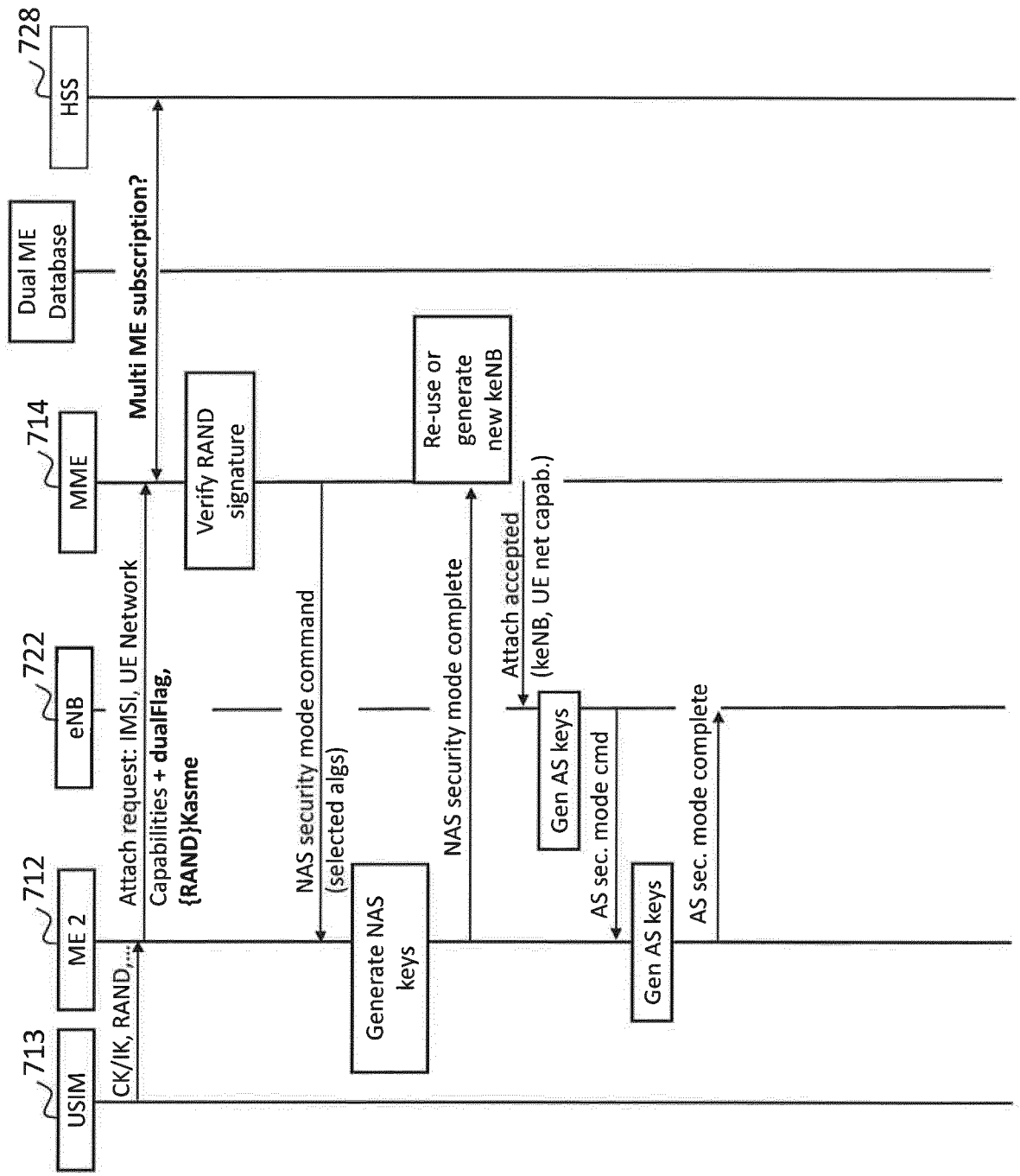
FIG. 11 illustrates a signaling diagram of a second exemplary variant of the second attach procedure according to the present disclosure.

FIG. 11 illustrates a signaling diagram of a second exemplary variant of the second attach procedure. This variant differs to the extent that authentication-related data stored by the wireless device 702 in the first attach procedure is reused by including data derived from the stored authentication-related data. In this variant, the USIM application 713 may provide the second mobile equipment 712 with the same CK, IK and RAND as used for the first mobile equipment 710 (and, optionally, other relevant parameters for key generation, such as UE capabilities and counters). The second mobile equipment 712 may then generate the $K_{ASME}$, sign the received RAND with it and send the second attach request including the signed RAND. The signed RAND may implicitly act as dual mode indication for the MME 714, or there may be an explicit dual mode indication as described above. The MME 714 may then verify that the RAND is the one used by the first mobile equipment 710 and is signed by the $K_{ASME}$ of the first mobile equipment 710. The context of the first mobile equipment 710 may be identified based on the IMSI. If successfully verified, the MME 714 may consider the second mobile equipment 712 authenticated. The remaining portion of the attach procedure may again continue in the conventional manner.

Figure 12:
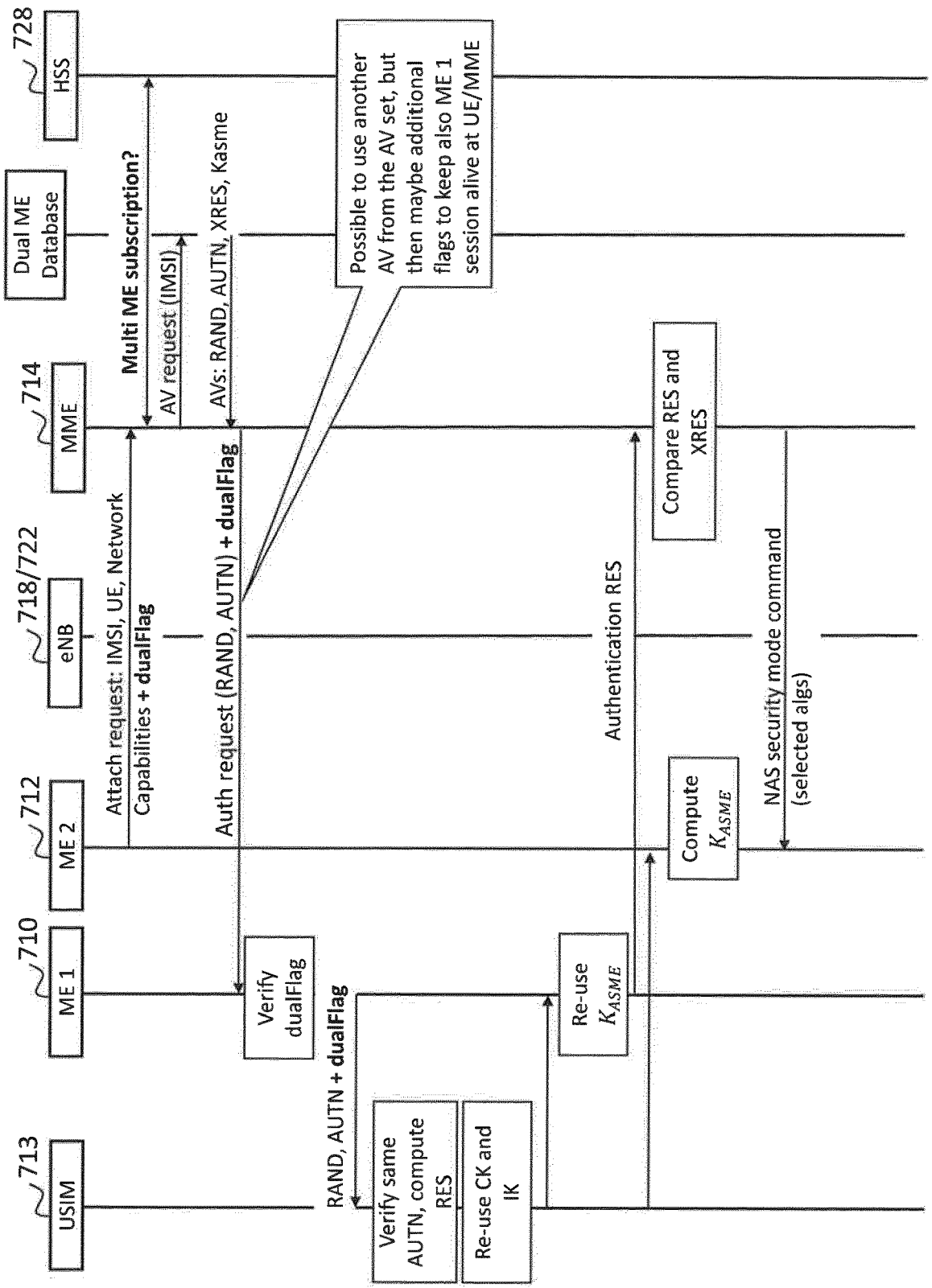
FIG. 12 illustrates a signaling diagram of a third exemplary variant of the second attach procedure according to the present disclosure.

FIG. 12 illustrates a signaling diagram of a third exemplary variant of the second attach procedure. This variant differs to the extent that, as part of the second attach procedure, an authentication request for authenticating the second mobile equipment 712 is sent to the first mobile equipment 710, wherein the first mobile equipment 710 triggers verification of whether the authentication request belongs to the second attach procedure. The MME 714 thus sends the authentication request to a different mobile equipment from where it received the attach request. The authentication request may optionally contain a dual mode indication. The first mobile equipment 710 may verify that the received dual mode indication corresponds to the actions of the second mobile equipment 712, which may simply be done by checking that the second mobile equipment 712 has sent an attach request or, if the dual mode indication corresponds to a random number, by checking that the received dual mode indication is the same as the one sent by the second mobile equipment 712 in the second attach request. In this way, attacks by random users trying to exploit the dual mode function and attempting to pretend to be the second mobile equipment 712 may be blocked. The authentication request may then be forwarded to the USIM application 713 which may provide the keys and response RES to both the first mobile equipment 710 and the second mobile equipment 712. In the shown example, the first mobile equipment 710 then responds to the authentication request, wherein, upon successful authentication, the procedure continues in the conventional manner.

Figure 13:
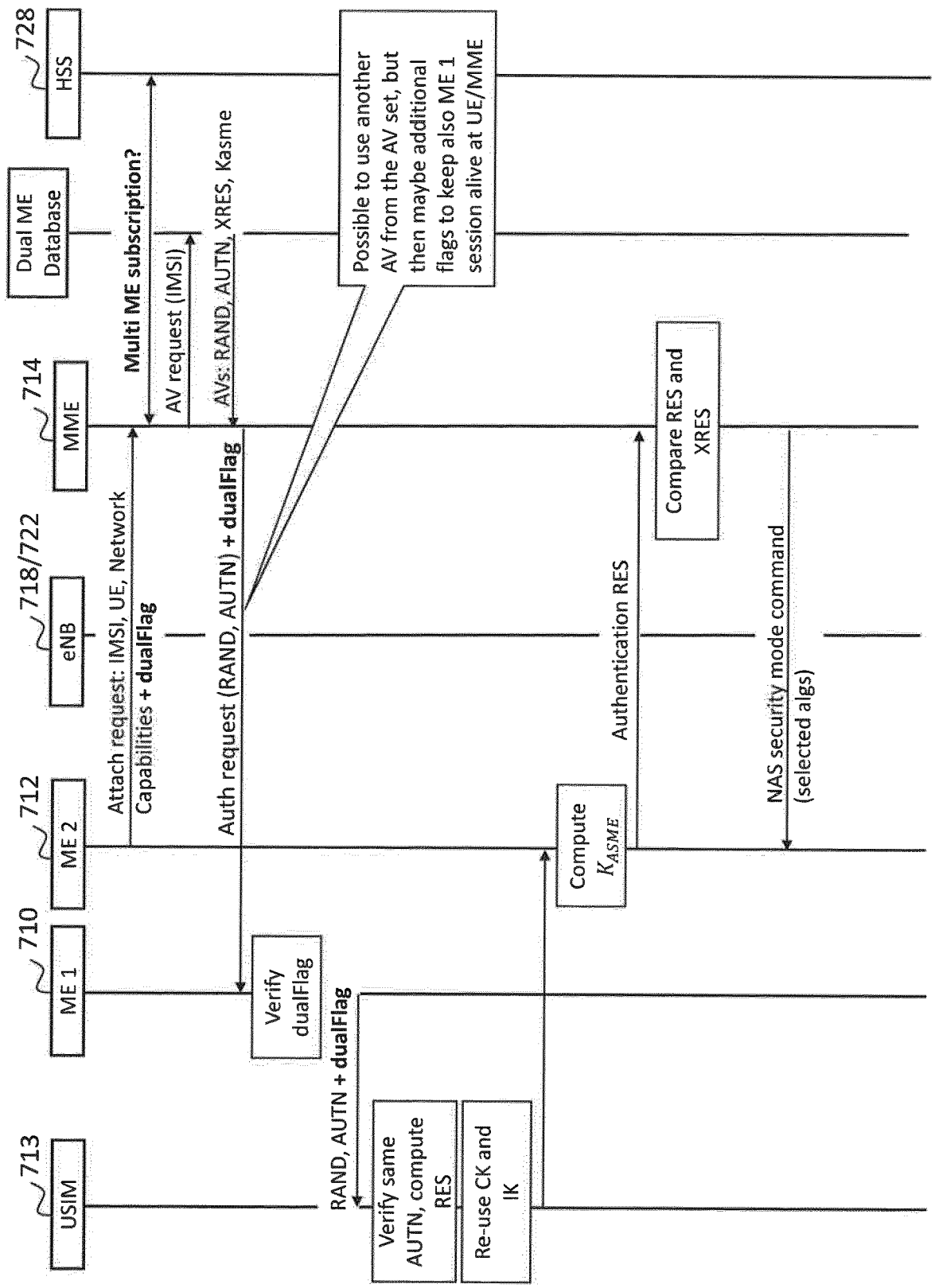
FIG. 13 illustrates a signaling diagram of a fourth exemplary variant of the second attach procedure according to the present disclosure.

FIG. 13 illustrates a signaling diagram of a fourth exemplary variant of the second attach procedure, which is identical to the third exemplary variant of FIG. 12, with the only difference being that the USIM application 713 provides the keys and response RES to the second mobile equipment 712 only, which then answers the authentication request instead of the first mobile equipment 710.

Figure 14:
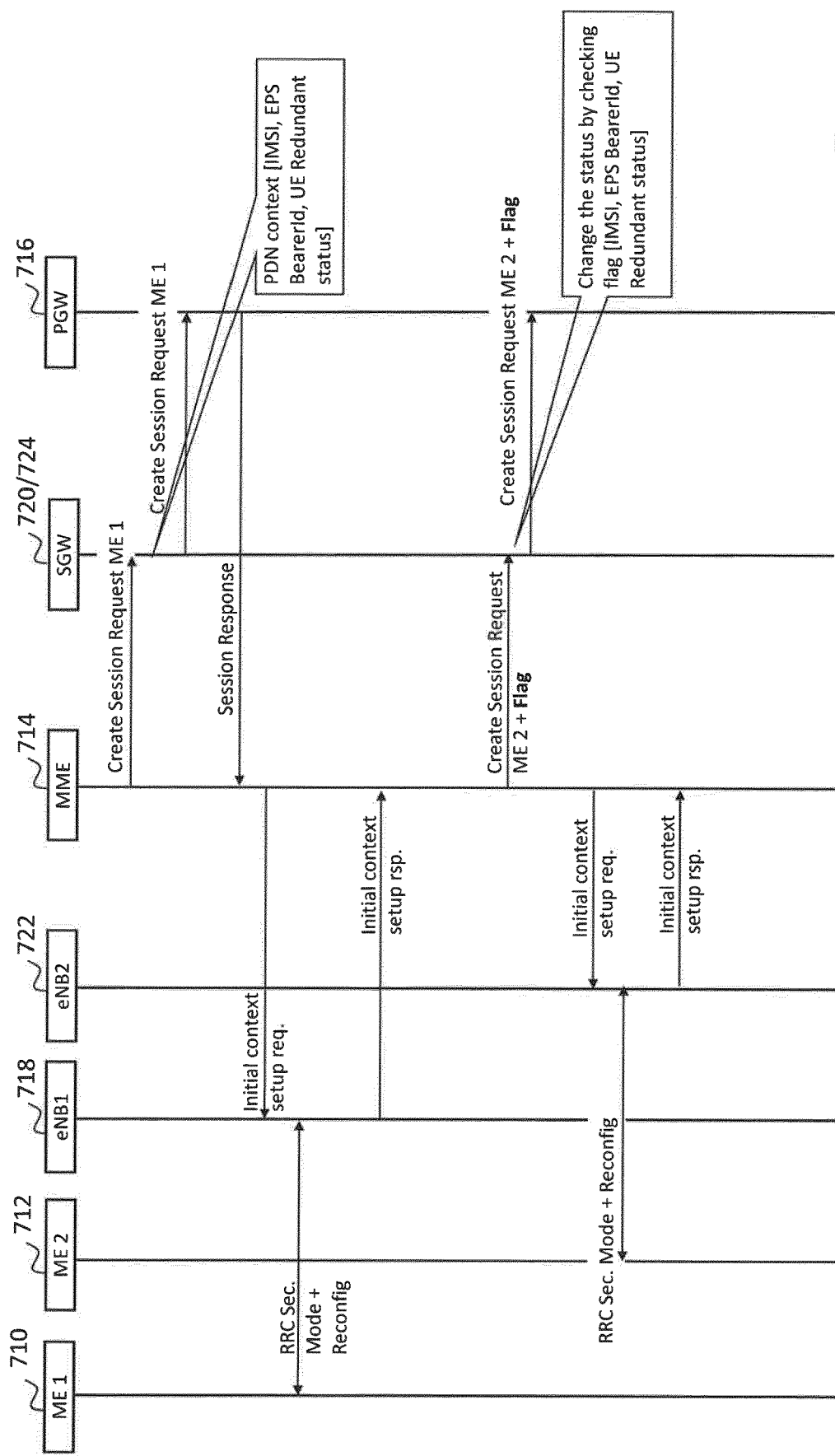
FIG. 14 illustrates a signaling diagram of a first exemplary procedure for providing a redundancy indication to the gateway according to the present disclosure.
Figure 15:
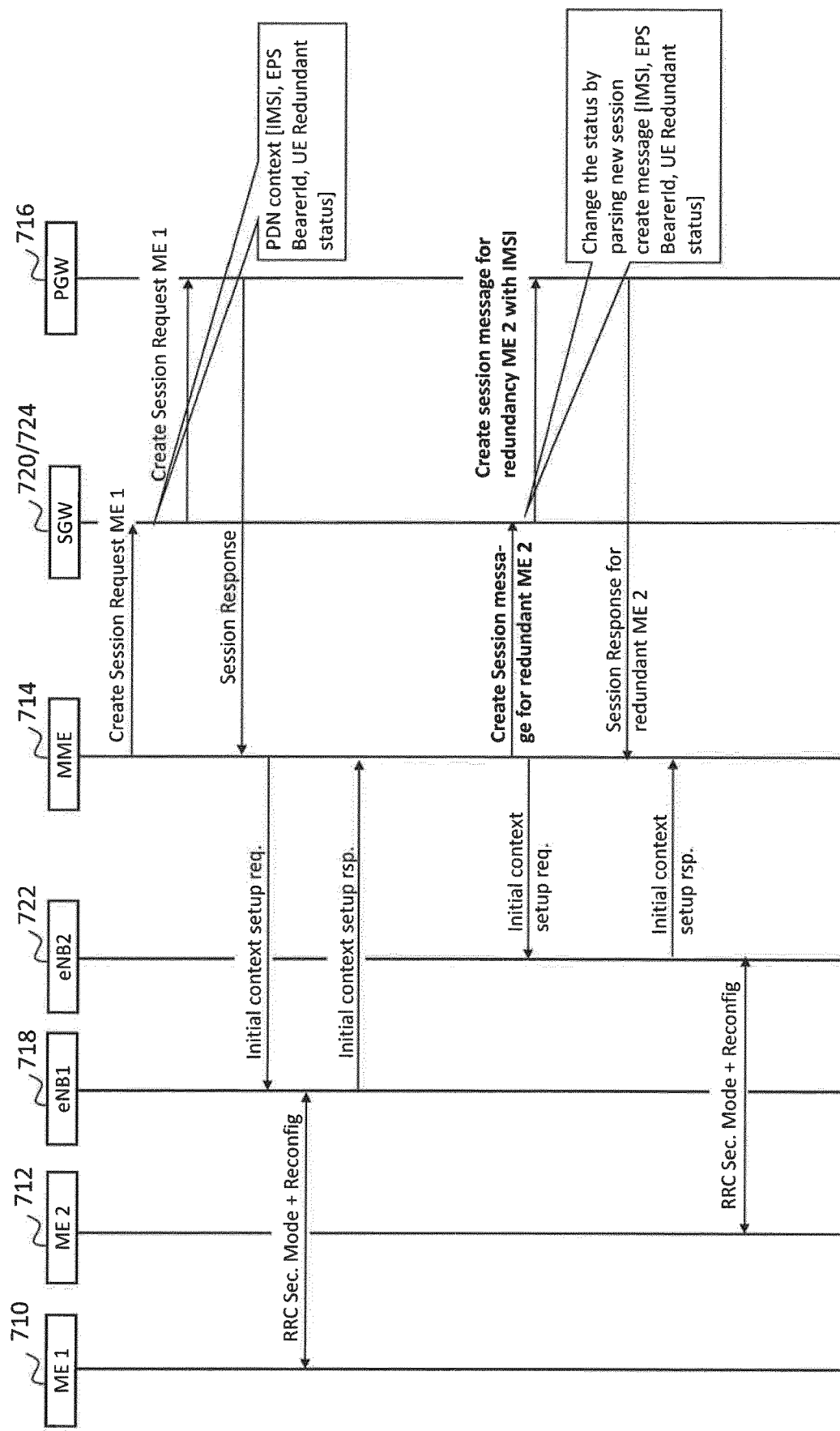
FIG. 15 illustrates a signaling diagram of a second exemplary procedure for providing a redundancy indication to the gateway according to the present disclosure.

FIGS. 14 and 15 illustrate signaling diagrams of exemplary procedures for providing a redundancy indication from the MME 714 to the PGW 716 to indicate to the PGW 716 that data received from the first mobile equipment 710 and the second mobile equipment 712 is transferred redundantly, thereby enabling the PGW 716 to link contexts for the first mobile equipment 710 and the second mobile equipment 712 together. Corresponding signaling may be performed using a GTP-C protocol between the MME 714, the corresponding SGW 720/724 and the PGW 716. The MME 714 may initiate creation of a session over the GTP-C protocol in a session creation request message using information elements, such as:
IMSI,
MSISDN,
ME 1 Identity
. . .

As mentioned above, conventional cellular networks may implement a behavior according to which an already existing session is deleted before creating a new session if the creation request collides with the existing session. Since, for redundant data transfer according to the technique presented herein, two sessions may need to be mapped to the same IMSI number, modifications to conventional signaling may be applied.

In one such variant, the creation of two sessions using the same IMSI (linking two contexts together) may be implemented using a redundancy indication provided in the form of an extension field included in a session creation request message of an existing session creation protocol. Such situation is shown in FIG. 14, where a conventional Packet Data Network (PDN) context is extended by the additional field "UE Redundant status" in the SGW 720/724 (i.e., PDN context [IMSI, EPS, BearerId, UE Redundant status]), wherein the additional field may be represented by a Boolean value (e.g., 0=disabled, 1=enabled), for example. Further, as shown in the figure, a flag may be used in the session creation request message concerning the second mobile equipment 712 to indicate that the IMSI number of the new session request will already have an established PDN context and that a new PDN context should be added to the same IMSI number.

In another variant, the creation of two sessions using the same IMSI may be implemented using a redundancy indication provided in the form of a dedicated session creation request message extending an existing session creation protocol. In such a new session creation request message, additional information elements may be used, such as:
IMSI,
MSISDN,
ME Identity for ME 1
ME Identity for ME 2
. . .

Information elements "ME Identity for ME 1" and "ME Identity for ME 2" may here provide information enabling the PGW 716 to set up two PDN contexts for the same IMSI number and link them together. Such situation is illustrated in FIG. 15.

As has become apparent from the above, the present disclosure provides a technique for providing reliable wireless communication between a wireless device and a cellular network. According to the presented technique, two mobile equipments may be attached to a single subscriber identity module and share the common security credentials used for authentication and control signaling. Both mobile equipments may use the same subscriber identity to enable the cellular network to perceive both mobile equipments as a single entity. Traffic may be merged and split on both the side of the wireless device and the side of the network, providing user plane redundancy in the core network and the access network, while applications or services running on top may be agnostic of the redundant data transfer. Increased availability and reliability of communication for applications and services running on top may thus be achieved and the negative effects of communication link, device, node or base station failures (software and/or hardware failures), or any other kind of malfunctions may be minimized. This may especially be advantageous in the industrial manufacturing domain. As both mobile equipments may use the same subscriber identity module to communicate the security parameters used to authenticate against the network and, in particular, since some of these security parameters may be reused, signaling required in the AKA procedures of the wireless device may be reduced. Also, the technique presented herein enables mapping two PDN contexts to a single IMSI number and thereby allows redundancy for user plane traffic in the core network by the use of multiple PDN connectivity links for a single IMSI.

It is believed that the advantages of the technique presented herein will be fully understood from the foregoing description, and it will be apparent that various changes may be made in the form, constructions and arrangement of the exemplary aspects thereof without departing from the scope of the invention or without sacrificing all of its advantageous effects. Because the technique presented herein can be varied in many ways, it will be recognized that the invention should be limited only by the scope of the claims that follow.

The invention claimed is:

1. A method for providing reliable wireless communication between a wireless device and a cellular network, the wireless device comprising a first mobile equipment and a second mobile equipment sharing a single subscriber identity module, the method being performed by the wireless device and comprising:

sending a first attach request as part of a first attach procedure to the cellular network using the first mobile equipment via a first base station to establish a first communication channel to the cellular network; and sending a second attach request as part of a second attach procedure to the cellular network using the second mobile equipment via a second base station to establish a second communication channel to the cellular network, wherein the first attach procedure and the second attach procedure are performed using a same subscriber identity provided by the single subscriber identity module and wherein, upon completion of the first attach procedure and the second attach procedure, data communicated between the wireless device and the cellular network is transferred redundantly over the first communication channel and the second communication channel.

2. The method of claim 1, wherein the wireless device serves as wireless communication gateway for a base application, wherein data transferred redundantly from the wireless device to the cellular network originates from the base application.

3. The method of claim 2, wherein data originating from the base application is duplicated by a redundancy component before being transferred to the cellular network over the first communication channel and the second communication channel.

4. The method of claim 2, wherein duplicate data transferred from the cellular network to the wireless device over the first communication channel and the second communication channel is dropped by a redundancy component before forwarding the transferred data to the base application.

5. The method of claim 1, wherein, in at least one of the first and the second attach procedure, a dual mode indication is sent from the wireless device to the cellular network indicating that the wireless device intends to transfer data redundantly over the first communication channel and the second communication channel.

6. The method of claim 1, wherein authentication-related data used in the first attach procedure is reused in the second attach procedure.

7. The method of claim 6, wherein the authentication-related data reused in the second attach procedure comprises a set of authentication vectors stored by the cellular network in the first attach procedure.

8. The method of claim 7, wherein, from the set of authentication vectors, an authentication vector different from an authentication vector used in the first attach procedure is used in the second attach procedure.

9. The method of claim 8, wherein an authentication request sent from the cellular network to the second mobile equipment includes a maintenance indication indicating to the wireless device to maintain a context already established for the first mobile equipment in the first attach procedure.

10. The method of claim 6, wherein the authentication-related data reused in the second attach procedure comprises authentication-related data stored by the wireless device in the first attach procedure.

11. A computer program product comprising a non-transitory computer readable medium storing computer program instructions for performing the method of claim 1 when the computer program product is executed on one or more computing devices.

12. A wireless device for providing reliable wireless communication to a cellular network, the wireless device comprising a first mobile equipment and a second mobile equipment sharing a single subscriber identity module, and the wireless device comprising at least one processor and at least one memory, the at least one memory containing instructions executable by the at least one processor such that the wireless device is operable to perform the method of claim 1.

13. A method for providing reliable wireless communication between a wireless device and a cellular network, the method being performed by a node of the cellular network and comprising:

receiving a first attach request from a first mobile equipment of the wireless device via a first base station as part of a first attach procedure to establish a first communication channel between the cellular network and the wireless device;

receiving a second attach request from a second mobile equipment of the wireless device via a second base station as part of a second attach procedure to establish a second communication channel between the cellular network and the wireless device, wherein, in the first attach procedure and the second attach procedure, a same subscriber identity is used and wherein, upon completion of the first attach procedure and the second attach procedure, data communicated between the wireless device and the cellular network is transferred redundantly over the first communication channel and the second communication channel.

14. The method of claim 13, wherein the second attach request is received upon completion of the first attach procedure.

15. The method of claim 13, wherein, in at least one of the first and the second attach procedure, a dual mode indication is received by the node from the wireless device indicating that the wireless device intends to transfer data redundantly over the first communication channel and the second communication channel.

16. The method of claim 13, wherein authentication-related data used in the first attach procedure is reused in the second attach procedure.

17. A node of a cellular network for providing reliable wireless communication between a wireless device and the cellular network, the node comprising at least one processor and at least one memory, the at least one memory containing instructions executable by the at least one processor such that the node is operable to perform the method of claim 13.

18. A method for providing reliable wireless communication between a wireless device and a cellular network, the method being performed by a gateway of the cellular network and comprising:

receiving first data over a first communication channel established between a first mobile equipment of the wireless device and the cellular network via a first base station;

receiving second data over a second communication channel established between a second mobile equipment of the wireless device and the cellular network via a second base station, wherein the first data and the second data are associated with a same subscriber identity and wherein the first data and the second data are transferred redundantly over the first communication channel and the second communication channel; and dropping duplicate data from the first data and the second data before forwarding the transferred data to a network-side application.

19. The method of claim 18, wherein data to be transferred from the network-side application to the wireless device is duplicated by the gateway before being transferred to the wireless device over the first communication channel and the second communication channel.

20. A gateway of a cellular network for providing reliable wireless communication between a wireless device and the cellular network, the gateway comprising at least one processor and at least one memory, the at least one memory containing instructions executable by the at least one processor such that the gateway is operable to perform the method of claim 18.

* * * * *